(12) United States Patent
Kogure

(10) Patent No.: US 11,240,826 B2
(45) Date of Patent: Feb. 1, 2022

(54) CONTROL APPARATUS, METHOD, PROGRAM, AND RECORDING MEDIUM

(71) Applicant: NEC CORPORATION, Tokyo (JP)

(72) Inventor: Yuki Kogure, Tokyo (JP)

(73) Assignee: NEC CORPORATION, Tokyo (JP)

( * ) Notice: Subject to any disclaimer, the term of this patent is extended or adjusted under 35 U.S.C. 154(b) by 58 days.

(21) Appl. No.: 16/608,613

(22) PCT Filed: Mar. 1, 2018

(86) PCT No.: PCT/JP2018/007761
§ 371 (c)(1),
(2) Date: Oct. 25, 2019

(87) PCT Pub. No.: WO2018/203436
PCT Pub. Date: Nov. 8, 2018

(65) Prior Publication Data
US 2021/0120565 A1    Apr. 22, 2021

(30) Foreign Application Priority Data
May 1, 2017 (JP) .............................. JP2017-090993

(51) Int. Cl.
*H04W 72/12* (2009.01)
*H04W 24/08* (2009.01)

(52) U.S. Cl.
CPC .......... *H04W 72/12* (2013.01); *H04W 24/08* (2013.01)

(58) Field of Classification Search
CPC ...... H04B 7/024; H04B 7/0617; H04B 7/063; H04B 7/0413; H04B 7/0697;
(Continued)

(56) References Cited

U.S. PATENT DOCUMENTS 9,706,415 B2 * 7/2017 Ponnuswamy ....... H04W 16/28
2012/0263068 A1   10/2012 Morimoto et al.
(Continued)

FOREIGN PATENT DOCUMENTS

CN    104105211 A  * 10/2014  ............ H04W 72/12
JP    2011-142516 A    7/2011
(Continued)

OTHER PUBLICATIONS

Int. Search Report (PCT/ISA/210) dated May 1, 2018 issued by the International Searching Authority in Application No. PCT/JP2018/007761.
(Continued)

*Primary Examiner* — Matthew C Sams
(74) *Attorney, Agent, or Firm* — Sughrue Mion, PLLC

(57) ABSTRACT

In order for a radio base station performing coordinated control with another radio base station, to appropriately perform scheduling for radio communication with a terminal apparatus, an apparatus of the present invention includes: an obtaining section configured to obtain information related to a first schedule for coordinated control between an access point 200A and an access point 200B; and a control section 133 configured to perform control related to a second schedule for the access point 200A to perform radio communication with a terminal apparatus 300, based on the information related to the first schedule.

11 Claims, 15 Drawing Sheets

(58) Field of Classification Search
CPC ... H04L 5/0035; H04L 5/0057; H04L 1/0026; H04W 16/28; H04W 72/12; H04W 72/1215; H04W 88/06; H01Q 3/2611
See application file for complete search history.

(56) References Cited

U.S. PATENT DOCUMENTS

| | | | |
|---|---|---|---|
| 2014/0198678 A1* | 7/2014 | Kim | H04L 5/001 370/252 |
| 2015/0049703 A1 | 2/2015 | Nobukiyo et al. | |
| 2015/0264704 A1* | 9/2015 | Park | H04W 72/1231 370/329 |
| 2015/0288427 A1* | 10/2015 | Wang | H04W 72/1284 370/329 |
| 2016/0080063 A1 | 3/2016 | Sahara | |
| 2016/0119947 A1* | 4/2016 | Park | H04B 7/024 370/329 |
| 2016/0269940 A1 | 9/2016 | Takeda et al. | |
| 2016/0295629 A1* | 10/2016 | Gubeskys | H04B 7/0456 |
| 2016/0373230 A1* | 12/2016 | Morita | H04W 72/042 |
| 2017/0230868 A1 | 8/2017 | Matsuo | |
| 2018/0205419 A1* | 7/2018 | Zhou | H04B 7/0617 |
| 2018/0263044 A1* | 9/2018 | Zhou | H04W 72/121 |

FOREIGN PATENT DOCUMENTS

| | | |
|---|---|---|
| JP | 2013-201575 A | 10/2013 |
| JP | WO2013/146273 A1 | 10/2013 |
| JP | 2015-12302 A | 1/2015 |
| JP | 2015-89028 A | 5/2015 |
| JP | 2015-119392 A | 6/2015 |
| JP | 2015-220618 A | 12/2015 |
| JP | 2016-501465 A | 1/2016 |
| JP | 2016-539592 A | 12/2016 |
| WO | 2014/171129 A1 | 10/2014 |
| WO | 2016/038770 A1 | 3/2016 |
| WO | 2016/084268 A1 | 6/2016 |

OTHER PUBLICATIONS

Written Opinion dated May 1, 2018, from the International Searching Authority in International Application No. PCT/JP2018/007761.
Japanese Office Action for JP Application No. 2019-516362 dated Dec. 15, 2020 with English Translation.
Japanese Office Action for JP Application No. 2019-516362 dated Feb. 9, 2021 with English Translation.
Japanese Office Communication for JP Application No. 2019-516362 dated Sep. 7, 2021 with English Translation.

* cited by examiner

CONTROL APPARATUS, METHOD, PROGRAM, AND RECORDING MEDIUM

CROSS REFERENCE TO RELATED APPLICATIONS

This application is a National Stage of PCT International Application No. PCT/JP2018/007761 filed on Mar. 1, 2018 which designates the United States, incorporated herein by reference, and which is based upon and claims the benefit of priority from Japanese Patent Application No. 2017-090993 filed on May 1, 2017, the entire contents of which are incorporated herein by reference.

BACKGROUND

Technical Field

The present invention relates to a control apparatus, a method, a program, and a recording medium.

Background Art

For Long Term Evolution (LTE), which is one of mobile communication system schemes standardized in the Third Generation Partnership Project (3GPP), Fifth Generation (5G), which is the successor of LTE, and the like, proposed has been a configuration in which one control apparatus (central base station) performs central control of operations of a plurality of radio base stations each performing radio communication with terminal apparatuses.

Specifically, as an example of a fronthaul interface in 5G, an example in which a functional partition point is defined between a Medium Access Control layer (MAC layer) and a Physical layer (PHY layer) in LTE protocol stack will be described.

In this case, upper layer function sections of layers including the MAC layer and upper layers thereof are arranged in a central base station that performs central control. Meanwhile, lower layer function sections of layers including the PHY layer and lower layers thereof are arranged in access points each including a multielement antenna apparatus. In such an arrangement, a scheduler function section included in the central base station performs scheduling, based on channel state information and the like received from the access points, and notifies the access points of radio resources allocated through the scheduling and modulation and coding scheme (MCS) information determined through the scheduling. In this way, radio base stations perform communication with terminal apparatuses.

Specifically, the scheduler included in the central base station obtains quality information (measurement value) of a communication channel between an access point and a terminal apparatus and selects an MCS, based on an estimated value of the quality information obtained by correcting the measurement value, to achieve a target BLER.

For example, PTL 1 describes acquiring quality information for a communication channel between a base station and a terminal apparatus, acquiring reception error information related to a reception error in a data communication using the communication channel, acquiring transmission limit time frame information configured by a base station adjacent to the base station, updating a correction value according to configured contents in the transmission limit time frame information and the reception error information, and estimating quality of the communication channel by using the correction value and the acquired quality information.

PTL 2 describes that each base station judges, via a central control station, whether a timing at which channel state information (CSI) transmitted from a terminal apparatus to a base station is measured is a timing obtained through measurement of a radio resource to which only a signal from the base station is assigned or a timing obtained through measurement of a radio resource to which both a signal from the base station and a signal of another cell performing coordinated control with the base station are assigned.

CITATION LIST

Patent Literature

[PTL 1] WO 2013/146273
[PTL 2] JP 2015-89028 A

SUMMARY

Technical Problem

However, in the technique disclosed in PTL 2, it is nothing, when seen from one radio base station, but obtaining information related to coordinated control of another radio base station at the time of measuring channel state information. Specifically, the one radio base station is not able to appropriately determine a modulation method, radio resources are unnecessarily consumed, or the like, since information related to data transmission of the other radio base station (cell) performing coordinated control with the one radio base station is unknown, at the time of performing radio resource allocation. Hence, it is not possible to appropriately perform scheduling for radio communication between a radio base station and a terminal apparatus.

An example object of the present invention is to provide a control apparatus, a method, a program, and a recording medium that allow a radio base station performing coordinated control with another radio base station, to appropriately perform scheduling for radio communication with a terminal apparatus.

Solution to Problem

A control apparatus of the present invention includes an obtaining section configured to obtain information related to a first schedule for coordinated control between a first radio base station and a second radio base station, and a control section configured to perform control related to a second schedule for the first radio base station to perform radio communication with a first terminal apparatus, based on the information related to the first schedule.

A method of the present invention includes obtaining information related to a first schedule for coordinated control between a first radio base station and a second radio base station, and performing control related to a second schedule for radio communication performed with a first terminal apparatus by the first radio base station, based on the information related to the first schedule.

A program of the present invention is a program that causes a processor to obtain information related to a first schedule for coordinated control between a first radio base station and a second radio base station, and perform control related to a second schedule for the first radio base station to perform radio communication with a first terminal apparatus, based on the information related to the first schedule.

A recording medium of the present invention is a computer-readable non-transitory recording medium having recorded thereon a program that causes a processor to obtain information related to a first schedule for coordinated control between a first radio base station and a second radio base station, and perform control related to a second schedule for the first radio base station to perform radio communication with a first terminal apparatus, based on the information related to the first schedule.

Advantageous Effects of Invention

According to the present invention, it is possible for a radio base station performing coordinated control with another radio base station, to appropriately perform scheduling for radio communication with a terminal apparatus. Note that, according to the present invention, instead of or together with the above effects, other effects may be exerted.

DESCRIPTION OF THE EXAMPLE EMBODIMENTS

Figure 1:
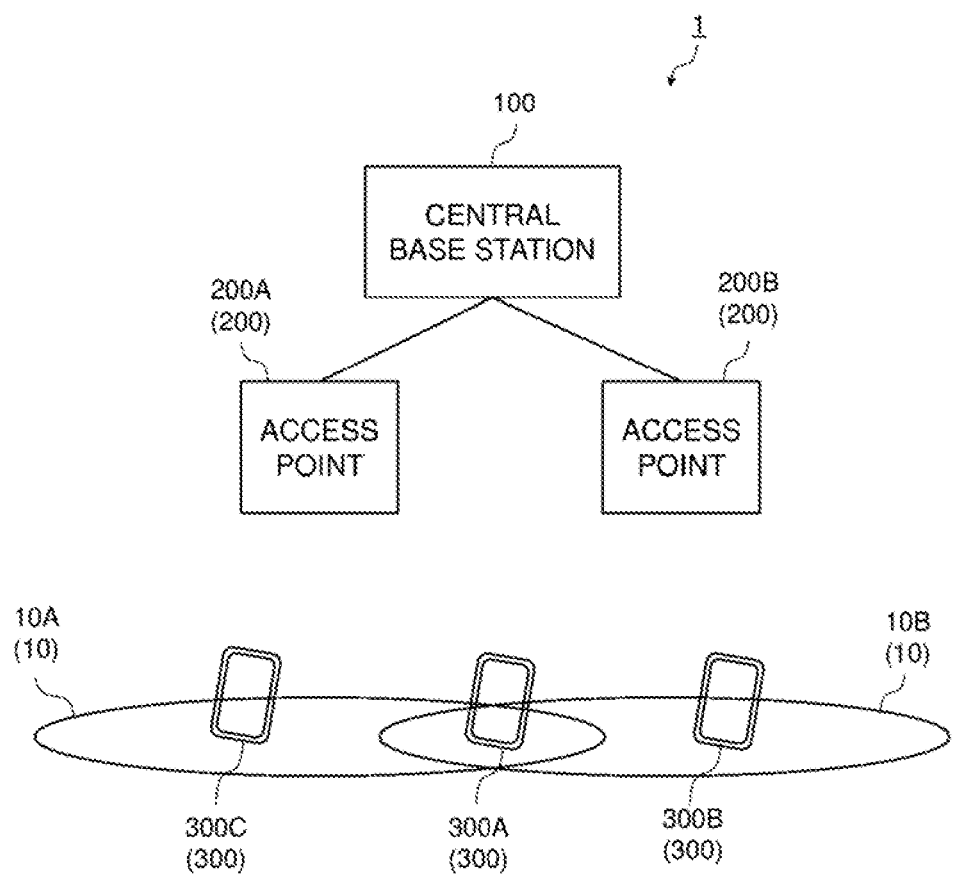
FIG. 1 is an explanatory diagram illustrating an example of a schematic configuration of a system according to example embodiments of the present invention.

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be given in the following order.
1. Related Art
2. Overview of Example Embodiments of the Present Invention
3. Configuration of System
4. First Example Embodiment
  4.1. Configuration of Central Base Station
  4.2. Technical Features
  4.3. Concrete Examples
5. Second Example Embodiment
  5.1. Configuration of Control Apparatus
  5.2. Technical Features
6. Other Aspects 1. Related Art A description will be given of scheduling, beamforming, and null steering that are performed by a central base station as techniques related to example embodiments of the present invention.

(1) Scheduling Performed by Central Base Station

In LTE, which is one of schemes for mobile communication systems standardized in 3GPP, 5G, which is the successor of LTE, and the like, proposed has been a configuration in which one control apparatus performs central control on operations of a plurality of radio base stations each performing radio communication with terminal apparatuses.

Specifically, as an example of a fronthaul interface in 5G, an example in which a functional partition point is defined between a MAC layer and a PHY layer in LTE protocol stack will be described.

In this case, upper layer function sections of layers including the MAC layer and upper layers thereof are arranged in a central base station that performs central control. Meanwhile, lower layer function sections of layers including the PHY layer and lower layers thereof are arranged in access points each including a multielement antenna apparatus. In such an arrangement, a scheduler function section included in the central base station performs scheduling, based on channel state information and the like received from the access points and notifies the access points of radio resources allocated through the scheduling and MCS information determined through the scheduling. In this way, the radio base stations perform communication with the terminal apparatuses.

Specifically, the scheduler included in the central base station obtains quality information (measurement value) of a communication channel between an access point and a terminal apparatus and selects an MCS, based on an estimated value of the quality information obtained by correcting the measurement value, to achieve a target BLER.

Specifically, the terminal apparatus measures communication quality information, such as a signal to interference plus noise ratio (SINR), converts the result into a quantized channel quality indicator (CQI), and reports the CQI to the central base station via the access point. Meanwhile, the central base station calculates, at the time of transmitting data to the terminal apparatus, an estimated SINR (SINR_Est) by using the reported CQI and selects an MCS index, based on the estimated SINR.

SINR_Est is calculated according to Equation (1) below. Here, SINR_CQI denotes an SINR corresponding to CQI, and SINR_Offset denotes a correction value of quality information.

$$SINR\_Est = SINR\_CQI + SINR\_Offset \quad \text{Equation (1)}$$

Controlling SINR_Offset described above to determine SINR_Est is outer loop link adaptation (OLLA). OLLA is performed through feedback control based on ACK/NACK for downlink data from the terminal apparatus.

In a case of receiving a notification about success of reception (ACK) from the terminal apparatus, SINR_Offset is updated to a greater value as in Equation (2) below. In contrast, in a case of receiving a notification about reception error (NACK) from the terminal apparatus, SINR_Offset is updated to a smaller value as in Equation (3) below. Correcting SINR_Est in this way can achieve a target error rate. Delta_SINR denotes an arbitrary fixed value, and Target_BLER denotes a target reception error rate.

$$SINR\_Offset = SINR\_Offset + Target\_BLER/(1 - Target\_BLER) * Delta\_SINR \text{ if ACK is received} \quad \text{Equation (2)}$$

$$SINR\_Offset = SINR\_Offset - Delta\_SINR \text{ if NACK is received} \quad \text{Equation (3)}$$

(2) Beamforming and Null Steering

The central base station can perform spatial multiplexing of terminal apparatuses using the same frequency, through a beamforming technique using multielement antennas included in access points. The central base station is also capable of suppressing, when a plurality of access points use the same frequency band, interfering to terminal apparatuses to which data is transmitted from other access points, through null steering.

2. Overview of Example Embodiments of the Present Invention

First, an overview of example embodiments of the present invention will be described.

(1) Technical Issues

However, scheduling in consideration of a state of load of each access point and the like results in a situation where performance of the above-mentioned null steering is not possible, in some cases. Consequently, for example, a reception error rate of data communication in a communication channel of one radio base station may vary depending on whether another radio base station performing coordinated control with the one radio base station performs null steering or does not perform null steering. For this reason, the central base station performing central control for the one radio base station is not able to estimate quality information with high accuracy. Hence, unnecessary resource allocation may occur at the time when the central base station determines MCS by using a quality correction value for each terminal apparatus.

An example object of the example embodiments of the present invention is to enable a radio base station performing coordinated control, for example, null steering described above, with another radio base station, to appropriately perform scheduling for radio communication with a terminal apparatus.

(2) Technical Features

In the example embodiments of the present invention, for example, information related to a first schedule for coordinated control between a first radio base station and a second radio base station is obtained, and control related to a second schedule for radio communication performed with a first terminal apparatus by the first radio base station is performed based on the information related to the first schedule.

This makes it possible, for example, for a radio base station (e.g., the first radio base station) performing coordinated control with another radio base station (e.g., the second radio base station), to appropriately perform scheduling for radio communication with a terminal apparatus.

Note that the above-described technical features are concrete examples of the example embodiments of the present invention, and it is apparent that the present example embodiments of the present invention are not limited to the above-described technical features.

3. Configuration of System

With reference to FIG. 1, an example of a configuration of a system 1 according to the example embodiments of the present invention will be described. FIG. 1 is an explanatory diagram illustrating an example of a schematic configuration of the system 1 according to the example embodiments of the present invention. With reference to FIG. 1, the system 1 includes a central base station 100, access points 200A and 200B (collectively referred to as access points 200), and a plurality of terminal apparatuses 300A, 300B, and 300C. The central base station 100 communicates with each of the access points 200A and 200B via a network. For example, the network is included in a radio access network (RAN).

For example, the system 1 is a system conforming to 3GPP standards. More specifically, the system 1 may be a system conforming to LTE/LTE-Advanced and/or System Architecture Evolution (SAE). Alternatively, the system 1 may be a system conforming to fifth-generation (5G) standards. It is apparent that the system 1 is not limited to these examples.

(1) Central Base Station 100

The central base station 100 is a node in the radio access network and configured to communicate, via the access points 200A and 200B, with terminal apparatuses (e.g., the terminal apparatuses 300) located in coverage areas 10A and 10B (collectively referred to as coverage areas 10) of the respective access points 200A and 200B. Each access point 200 is anode in the radio access network and performs radio communication with the terminal apparatuses 300.

Specifically, the central base station 100 is, for example, connected with each access point 200 via an interface called a fronthaul interface and the interface is used for a control signal and a data transmission and/or reception signal with the access point 200. The access point 200 performs radio communication with the terminal apparatuses 300 via an antenna.

Each of the central base station 100 and the access points 200 is a node configured to perform communication with the terminal apparatuses 300 and is, in other words, a node in the radio access network (RAN). For example, the central base station 100 and the access points 200 may be constituent elements of an evolved Node B (eNB) or may be constituent elements of a generation Node B (gNB) in 5G. The central base station 100 may be a first unit (or a first node) configured to perform upper protocol layer processing, and each access point 200 may be a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second section may be referred to as a radio unit (RU) or a remote unit (RU). The digital unit (DU) may be a base band unit (BBU), and the RU may be a remote radio head (RRH) or a remote radio unit (RRU). It is apparent that the terms for the first unit (or the first node) and the second unit (or the second node) are not limited to these examples. Alternatively, the central base station 100 and the access points 200 may be a single unit (or a single node). In this case, the central base station 100 may be one of the plurality of units (e.g., either one of the first unit and the second unit) and may be connected to another unit of the plurality of units (e.g., the access point 200).

(2) Terminal Apparatus 300

Each terminal apparatus 300 is configured to perform radio communication with the corresponding access point 200. For example, since the coverage areas 10A and 10B are adjacent to each other, the terminal apparatus 300A locates in both the coverage area 10A of the access point 200A and the coverage area 10B of the access point 200B and performs radio communication with each of the access points 200A and 200B. The terminal apparatus 300B locates in the coverage area 10B of the access point 200B and performs radio communication with the access point 200B. The terminal apparatus 300C locates in the coverage area 10A of the access point 200A and performs radio communication with the access point 200A. For example, the terminal apparatus 300 is a user equipment (UE).

4. First Example Embodiment

Next, a description will be given of a first example embodiment of the present invention.

4.1. Configuration of Central Base Station

Figure 2:
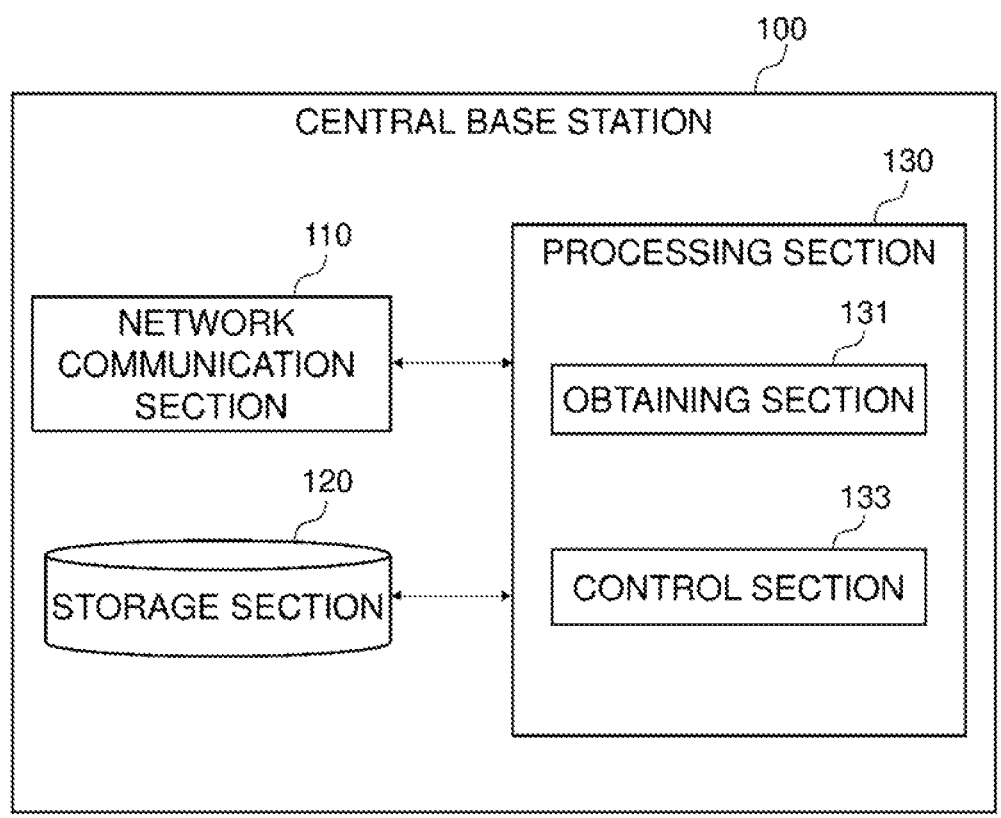
FIG. 2 is a block diagram illustrating an example of a schematic configuration of a central base station according to a first example embodiment.

Next, with reference to FIG. 2, a description will be given of an example of a configuration of the central base station 100 according to the first example embodiment. FIG. 2 is a block diagram illustrating an example of a schematic configuration of the central base station 100 according to the first example embodiment. With reference to FIG. 2, the central base station 100 includes a network communication section 110, a storage section 120, and a processing section 130.

(1) Network Communication Section 110

The network communication section 110 receives a signal from a network and transmits a signal to the network. For example, the network communication section 110 receives a signal from each access point 200 and transmits a signal to the access point 200.

(2) Storage Section 120

The storage section 120 temporarily or permanently stores programs (instructions) and parameters for operations of the central base station 100 as well as various data. The program includes one or more instructions for operations of the central base station 100.

(3) Processing Section 130

The processing section 130 provides various functions of the central base station 100. The processing section 130 includes an obtaining section 131 and a control section 133. Note that the processing section 130 may further include constituent elements other than these constituent elements. In other words, the processing section 130 may also perform operations other than the operations of these constituent elements. Specific operations of the obtaining section 131 and the control section 133 will be described later in detail.

The control section 133, for example, performs selection of a terminal apparatus to which a radio resource for data transmission is to be allocated, resource allocation, data modulation, and the like, based on channel state (e.g., communication quality) between each access point 200 and the terminal apparatuses 300.

(4) Implementation Example

The network communication section 110 may be implemented with a network adapter and/or a network interface card, and the like. The storage section 120 may be implemented with a memory (e.g., a nonvolatile memory and/or a volatile memory) and/or a hard disk, and the like. The processing section 130 may be implemented with one or more processors such as a baseband (BB) processor and/or a different kind of processor. The obtaining section 131 and the control section 133 may be implemented with the same processor or may be implemented with separate processors. The memory (storage section 120) may be included in the one or more processors or may be provided outside the one or more processors.

The central base station 100 may include a memory configured to store a program (instructions) and one or more processors that can execute the program (instructions). The one or more processors may execute the program and thereby perform operations of the processing section 130 (operations of the obtaining section 131 and/or the control section 133). The program may be a program for causing the processor(s) to execute operations of the processing section 130 (operations of the obtaining section 131 and/or the control section 133).

4.2. Technical Features

Next, technical features of the first example embodiment will be described.

The central base station 100 (obtaining section 131) obtains information related to a first schedule for coordinated control between the first radio base station (e.g., the access point 200A) and the second radio base station (e.g., the access point 200B). The central base station 100 (control section 133) then performs control related to a second schedule for the first radio base station (e.g., the access point 200A) to perform radio communication with the first terminal apparatus (e.g., the terminal apparatus 300A), based on the information related to the first schedule.

For example, the central base station 100 (control section 133) may allocate a radio resource for radio communication to be performed with the first terminal apparatus (e.g., the terminal apparatus 300A) by the first radio base station (e.g., the access point 200A) and thereafter perform control related to the second schedule for the first radio base station (e.g., the access point 200A) to perform radio communication with the first terminal apparatus (e.g., the terminal apparatus 300A), based on the information related to the first schedule.

(1) Coordinated Control

Coordinated control refers, for example, to downlink coordinated control such as coordinated scheduling (referred to as CS below), coordinated beamforming (referred to as CB below), dynamic point selection (referred to as DPS below), and joint transmission (referred to as JT below), or uplink coordinated control such as joint reception (referred to as JR below).

In the CS, the CB, and the DPS, data is transmitted to the first terminal apparatus (e.g., the terminal apparatus 300A) through a beam formed by one of the first radio base station (e.g., the access point 200A) and the second radio base station (e.g., the access point 200B), at each transmission timing.

Specifically, in the CS and the CB, for example, the access points 200A and 200B coordinate with each other to execute scheduling, beamforming, and the like. In other words, in the CS and the CB, data is transmitted from one access point (e.g., the access point 200A) to the terminal apparatus 300A. In the DPS, for example, the access points 200A and 200B coordinate with each other, and data is transmitted from each of the access points 200A and 200B to the terminal apparatus 300A. In other words, in the DPS, data is transmitted from one access point to the terminal apparatus 300A at each transmission timing.

In the JT, the first radio base station (e.g., the access point 200A) and the second radio base station (e.g., the access point 200B) coordinate with each other to transmit data to the first terminal apparatus (e.g., the terminal apparatus 300A) simultaneously. In the JT, signals from the respective access points 200A and 200B do not interfere with each other to be therefore able to increase gain.

Moreover, in the JR, data is transmitted from the first terminal apparatus (e.g., the terminal apparatus 300A) to the first radio base station (e.g., the access point 200A) and the second radio base station (e.g., the access point 200B) simultaneously. In other words, in the JR, the access points 200A and 200B coordinate with each other, and the access points 200A and 200B receive data from the first terminal apparatus (e.g., the terminal apparatus 300A) simultaneously.

(2) Information Related to First Schedule

When the coordinated control is the CS, the CB, or the DPS, the information related to the first schedule includes information indicating whether the second radio base station (e.g., the access point 200B) performs null steering for the first terminal apparatus (e.g., the terminal apparatus 300A).

When the coordinated control is the JT, the information related to the first schedule includes information indicating whether the first radio base station (e.g., the access point 200A) and the second radio base station (e.g., the access point 200B) simultaneously transmit data to the first terminal apparatus (e.g., the terminal apparatus 300A).

When the coordinated control is the JR, the information related to the first schedule includes information indicating whether the first terminal apparatus (e.g., the terminal apparatus 300A) simultaneously transmits data to the first radio base station (e.g., the access point 200A) and the second radio base station (e.g., the access point 200B).

The information related to the first schedule may include information indicating whether the second radio base station (e.g., the access point 200B) allocates a radio resource to the second terminal apparatus (e.g., the terminal apparatus 300B).

(3) Information Related to Second Schedule

The control related to the second schedule includes, for example, determination of data modulation for transmission to the first terminal apparatus (e.g., the terminal apparatus 300A). In other words, the central base station 100 (control section 133) makes determination about data modulation for transmission to the first terminal apparatus (e.g., the terminal apparatus 300A), based on the information related to the first schedule.

The control related to the second schedule may include radio resource allocation for the first radio base station (e.g., the access point 200A) to perform radio communication with the first terminal apparatus (e.g., the terminal apparatus 300A). In other words, the central base station 100 (control section 133) may perform radio resource allocation for the first radio base station (e.g., the access point 200A) to perform radio communication with the first terminal apparatus (e.g., the terminal apparatus 300A), based on the information related to the first schedule.

Moreover, the control related to the second schedule may be performed based on a result of estimation of communication quality between the first radio base station (e.g., a certain point 200A) and the first terminal apparatus (e.g., the terminal apparatus 300A). Specifically, the central base station 100 (control section 133) may estimate communication quality between the first radio base station (e.g., the access point 200A) and the first terminal apparatus (e.g., the terminal apparatus 300A), based on the information related to the first schedule and perform the control related to the second schedule by using the estimated communication quality.

4.3. Concrete Examples

Next, concrete examples will be described.

Figure 3:
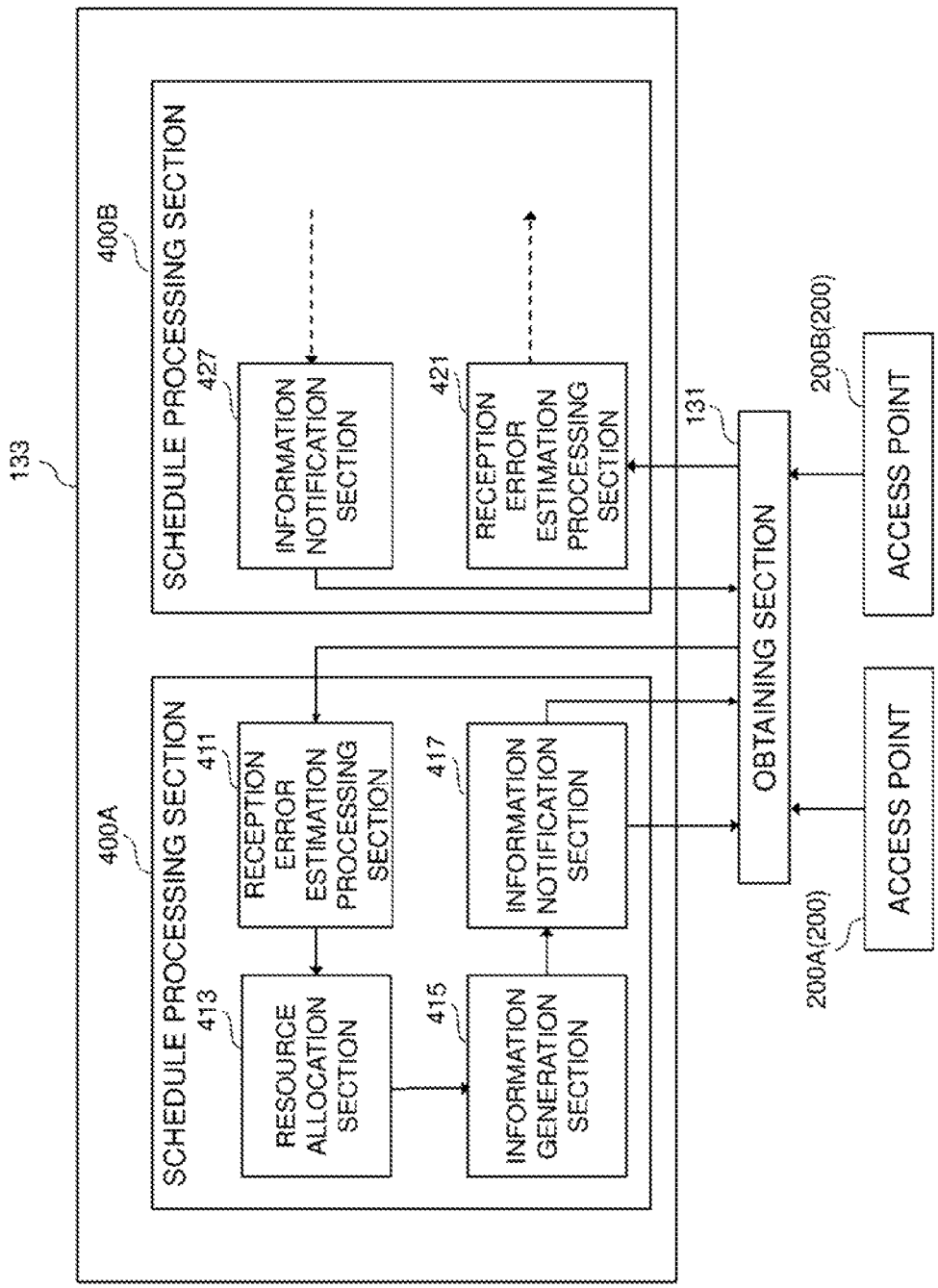
FIG. 3 is a diagram illustrating a concrete configuration of a control section according to a concrete example.

FIG. 3 is a diagram illustrating a concrete configuration of the control section 133 according to a concrete example. As illustrated in FIG. 3, for example, the control section 133 according to a concrete example includes a schedule processing section 400A for the access point 200A and a schedule processing section 400B for the access point 200B. As illustrated in FIG. 3, a description will be given below by focusing on operations of the schedule processing section 400A for convenience.

As illustrated in FIG. 3, the schedule processing section 400A includes a reception error estimation processing section 411, a resource allocation section 413, an information generation section 415, and an information notification section 417.

The reception error estimation processing section 411 estimates communication quality, based on information obtained by the obtaining section 131. Specifically, the reception error estimation processing section 411 corrects communication quality measurement information, based on feedback information (e.g., communication quality measurement information) from the access point 200A and the information related to the first schedule (e.g., notification information from an information notification section 427 of the schedule processing section 400B) to thereby estimate the communication quality and notify the resource allocation section 413 of the estimated communication quality.

The resource allocation section 413 performs resource allocation to transmit, to the terminal apparatus 300, determination of data modulation for transmission data to the terminal apparatus 300, and the like, based on the estimated communication quality. The resource allocation section 413 notifies the information generation section 415 of resource allocation information of the resource allocated to the terminal apparatus 300.

The information generation section 415 generates information to notify a reception error estimation processing section 421 of the schedule processing section 400B, based on the resource allocation information.

The information notification section 417 notifies the reception error estimation processing section 421 of the schedule processing section 400B via the obtaining section 131 of the information generated by the information generation section 415, for example.

(1) First Concrete Example

In a first concrete example, coordinated control in which transmission is performed only by one access point at one timing, as in the CS, the CB, and the DPS. The access points 200A and 200B employ adaptive-array antennas each including a multielement antenna. Each adaptive-antenna performs adaptive control on weighting of antenna elements depending on propagation environment to be able to obtain directional gain of the antenna. In particular, the access points 200A and 200B perform beamforming and null steering at the time of communicating with the terminal apparatuses 300 in the coverage areas 10A and 10B.

Figure 4:
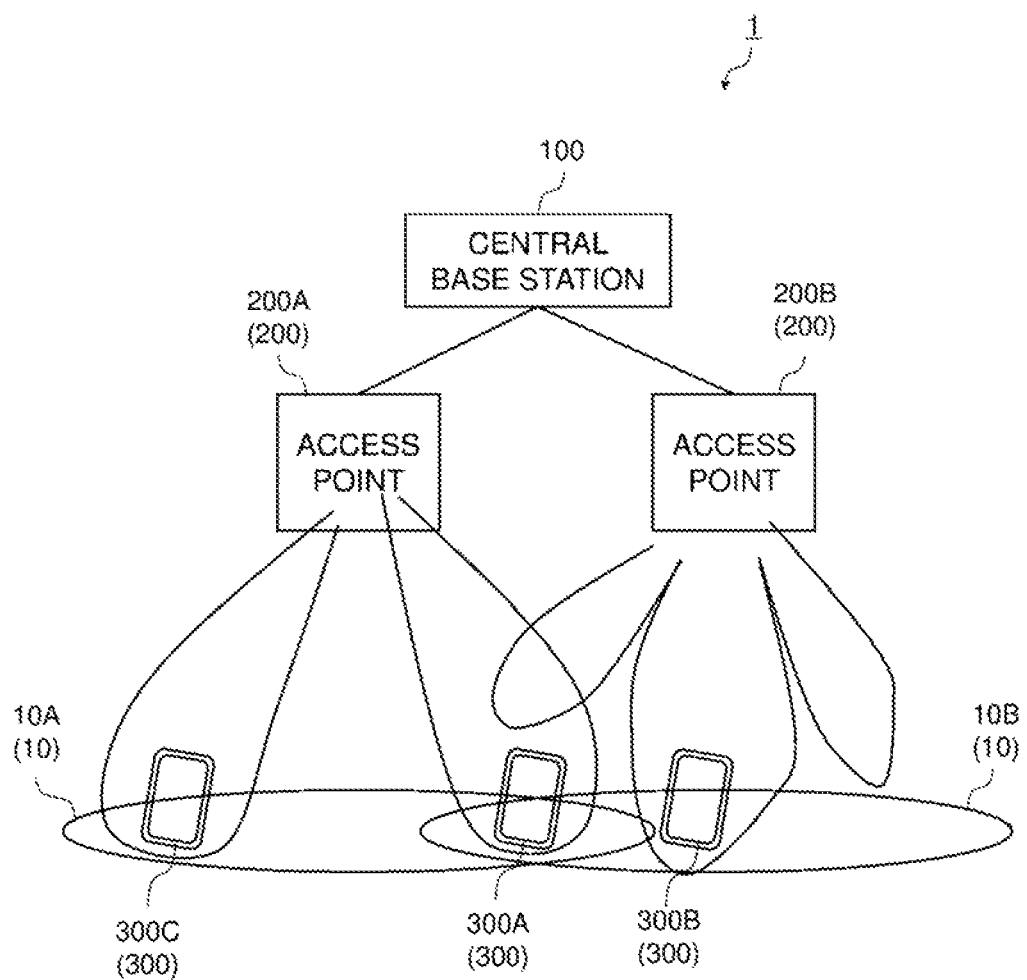
FIG. 4 is a diagram schematically illustrating an example of operations for performing beamforming transmission to a terminal apparatus under coordinated control between access points.

FIG. 4 is a diagram schematically illustrating an example of operations of performing beamforming transmission to the terminal apparatuses 300 under coordinated control between the access points 200A and 200B. As illustrated in FIG. 4, the access point 200B performs null steering for the terminal apparatus 300A at the time of data transmission to the terminal apparatus 300B.

Here, in a case of performing spatial multiplexing for users using the same frequency through beamforming, the multiplexing order changes according to the number of antenna elements of the adaptive-array antennas. Since antenna elements are also needed to perform null steering, whether null steering can be performed also relates to the number of users for whom multiplexing is performed for data transmission.

Figure 5:
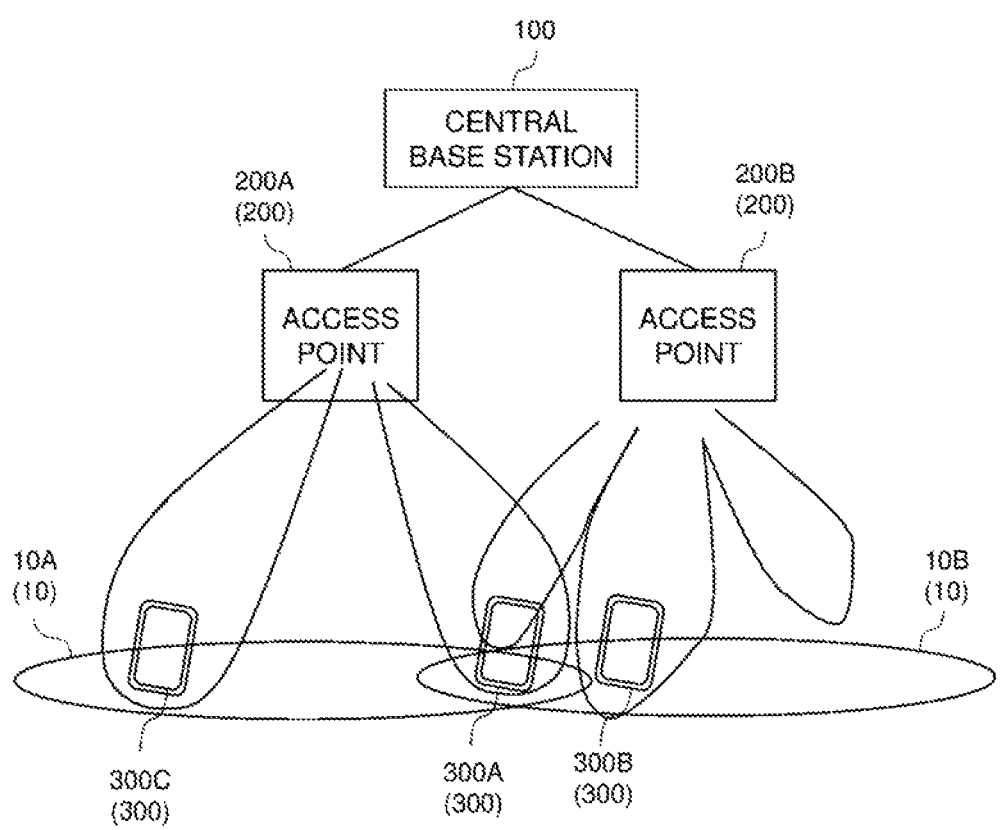
FIG. 5 is a diagram schematically illustrating another example of the operations for performing beamforming transmission to the terminal apparatus under coordinated control between the access points.

FIG. 5 is a diagram schematically illustrating another example of operations of performing beamforming transmission to the terminal apparatuses 300 by coordinated control between the access points 200A and 200B.

As illustrated in FIG. 5, the access point 200B is not able to perform null steering on the terminal apparatus 300A due to an influence of the above-described number of users for whom multiplexing is performed, in some cases. In such a case, there arises a problem that sidelobe of a signal to the terminal apparatus 300B may serve as an interference wave for the terminal apparatus 300A.

In the first concrete example, the following operations are performed to solve the above-described problem.

Figure 6:
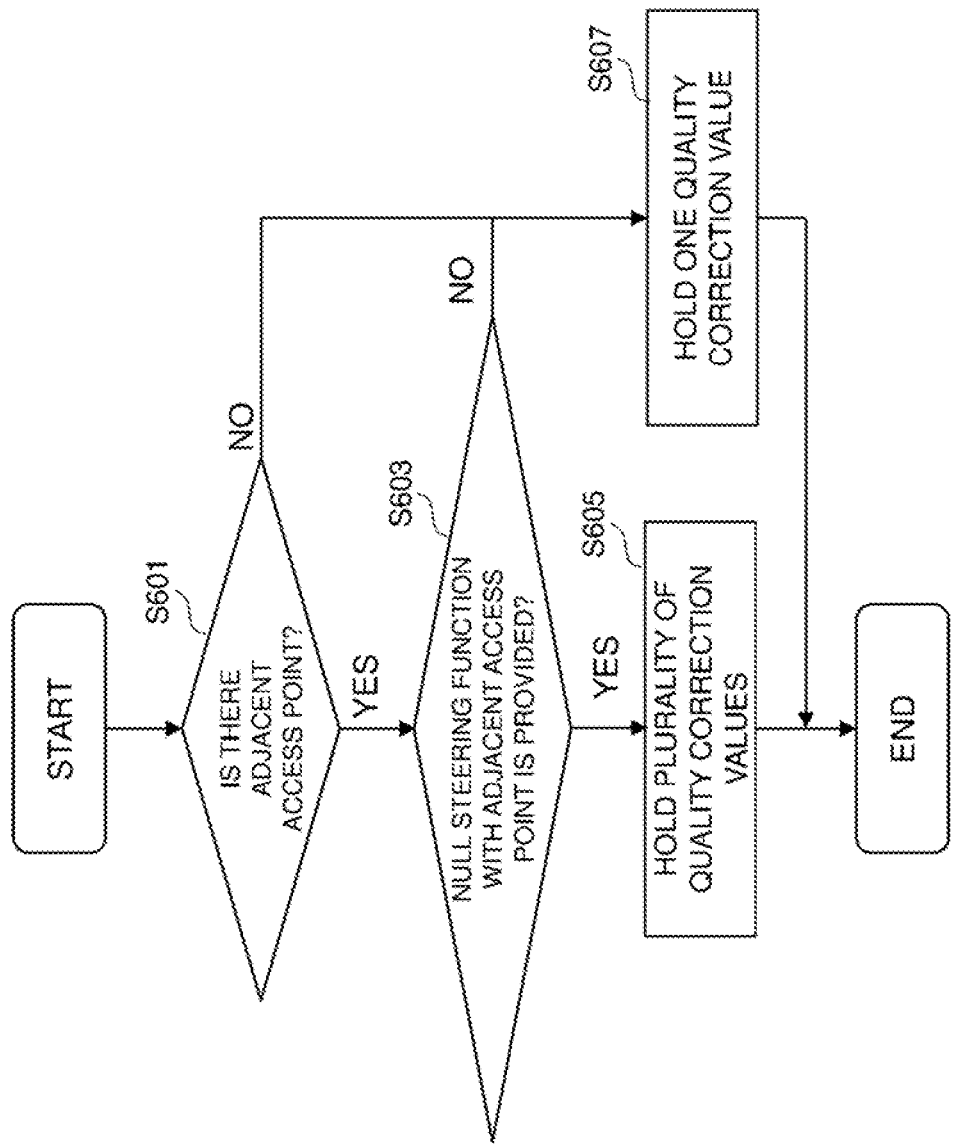
FIG. 6 is a flowchart illustrating an operation example of a quality correction value calculation process by a reception error estimation processing section.

FIG. 6 is a flowchart illustrating an operation example of a quality correction value calculation process by the reception error estimation processing section 411.

In Step S601, after determining the first terminal apparatus (e.g., the terminal apparatus 300A) for the access point 200A, the reception error estimation processing section 411 judges whether there is an adjacent access point. Here, the adjacent access point is an access point (e.g., the access point 200B) using the same frequency band. If there is an adjacent access point (S601: YES), the process advances to Step S603; if there is no adjacent access point (S601: NO), the process advances to Step S607.

In Step S603, the reception error estimation processing section 411 judges whether the adjacent access point (e.g., the access point 200B) has a null steering function. If the adjacent access point has the null steering function (S603: YES), the process advances to Step S605; if the adjacent access point does not have the null steering function (S603: NO), the process advances to Step S607.

In Step S605, the reception error estimation processing section 411 holds a plurality of quality correction values SINR_Offset and then terminates the process illustrated in FIG. 6.

In Step S607, the reception error estimation processing section 411 holds one quality correction value SINR_Offset and then terminates the process illustrated in FIG. 6.

Here, each held SINR_Offset has a unique initial value. The initial value SINR_Offset_Init is determined according to the following equation, for example.

$$\text{SINR\_Offset\_Init} = \frac{1}{N} \sum_{i=1}^{N} \text{average}(\text{SINR\_Offset}(i)) \qquad \text{[Math 1]}$$

SINR_Offset denotes a value obtained by averaging, among all the user terminal apparatuses N, the averages SINR_Offset each being for the terminal apparatuses i managed on an access point-by-access point basis.

Note that the initial value SINR_Offset_Init may be determined for each of groups of terminal apparatuses divided according to the locations instead of for all the terminal apparatuses. Alternatively, the initial value may be determined for each of the groups divided according to the types of the terminal apparatuses.

Figure 7:
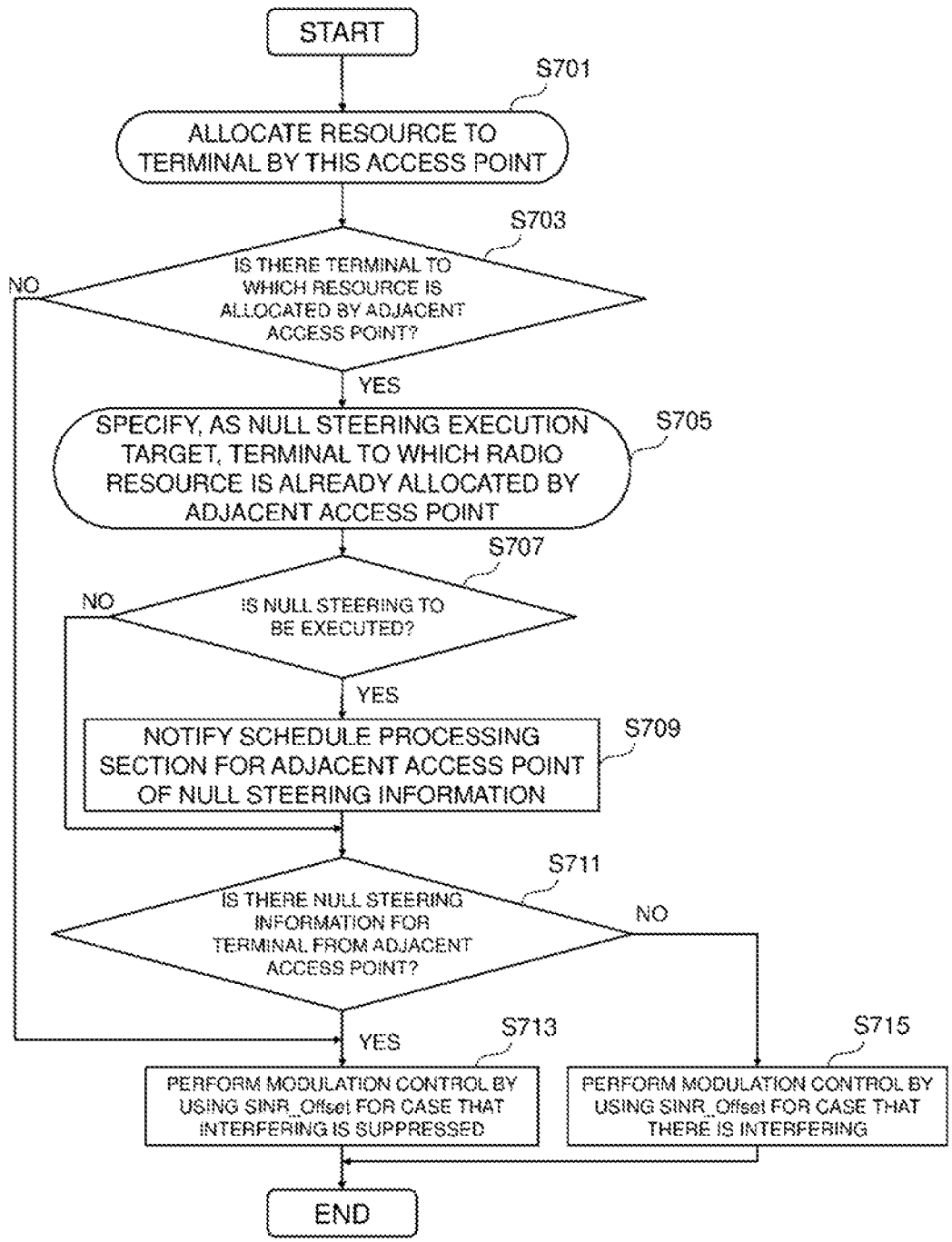
FIG. 7 is a flowchart illustrating resource allocation operation, null steering operation, and operation for making a judgment for a quality correction value SINR_Offset.

Next, a description will be given of operations at the time of resource allocation according to the present concrete example by using FIG. 7. FIG. 7 is a flowchart illustrating resource allocation operation, null steering operation, and operation for making a judgment for a quality correction value SINR_Offset.

In Step S701, the resource allocation section 413 allocates a radio resource to the first terminal apparatus (e.g., the terminal apparatus 300A) performing radio communication with the access point 200A, and the process then advances to Step S703.

In Step S703, the schedule processing section 400A receives information related to the terminal apparatus to which the radio resource is allocated by the schedule processing section for the adjacent access point (schedule processing section 400B for the access point 200B) via the obtaining section 131, for example.

Then, the schedule processing section 400A judges whether a resource is allocated to the second terminal apparatus (e.g., the terminal apparatus 300B) by the adjacent access point (e.g., the access point 200B), based on the received information. If there is a null steering target terminal to which a resource is allocated by the adjacent access point (e.g., the access point 200B), i.e., the second terminal apparatus (e.g., the terminal apparatus 300B) (S703: YES), the process advances to Step S705. In contrast, if there is no null steering target terminal to which a resource is allocated by the adjacent access point (S703: NO), the process advances to Step S713 without advancing to Steps S705 to S709 by assuming that there is no interfering to the adjacent access point (e.g., the access point 200B) of the access point 200A.

In Step S705, the schedule processing section 400A specifies, as a null steering execution target by the access point 200A, the second terminal apparatus (e.g., the terminal apparatus 300B) for which data transmission from the adjacent access point (e.g., the access point 200B) is already determined, and the process then advances to Step S707.

In Step S707, the schedule processing section 400A judges whether the access point 200A is to execute null steering on the second terminal apparatus (e.g., the terminal apparatus 300B) for which data transmission from the adjacent access point (e.g., the access point 200B) is already determined. If the access point 200A is to execute null steering (S707: YES), the process advances to Step S709; if the access point 200A does not execute null steering (S707: NO), the process advances to Step S711 without advancing to Step S709.

In Step S709, the information generation section 415 generates null steering information indicating that the access point 200A executes null steering. The information notification section 417 then notifies the schedule processing section 400B of the generated null steering information via the obtaining section 131, for example, and the process then advances to Step S711.

In Step S711, the schedule processing section 400A judges whether null steering information (first schedule information) indicating that null steering is to be performed for the first terminal apparatus (e.g., the terminal apparatus 300A) is received from the schedule processing section for the adjacent access point (e.g., the schedule processing section 400B for the access point 200B) via the obtaining section 131. If null steering information is received (S711: YES), the process advances to Step S713; if null steering execution information is not received (S711: NO), the process advances to Step S715.

In Step S713, the schedule processing section 400A performs modulation control (control related to the second schedule) such as determination of a modulation scheme, for example, based on SINR estimated by using SINR_Offset for a case that interfering is suppressed, for the first terminal apparatus (e.g., the terminal apparatus 300A), and then terminates the process illustrated in FIG. 7.

In Step S715, the schedule processing section 400A performs modulation control (control related to the second schedule), such as determination of a modulation scheme, for example, based on SINR estimated by using SINR_Offset for a case that there is interfering, for the first terminal apparatus (e.g., the terminal apparatus 300A), and then terminates the process illustrated in FIG. 7.

Figure 8:
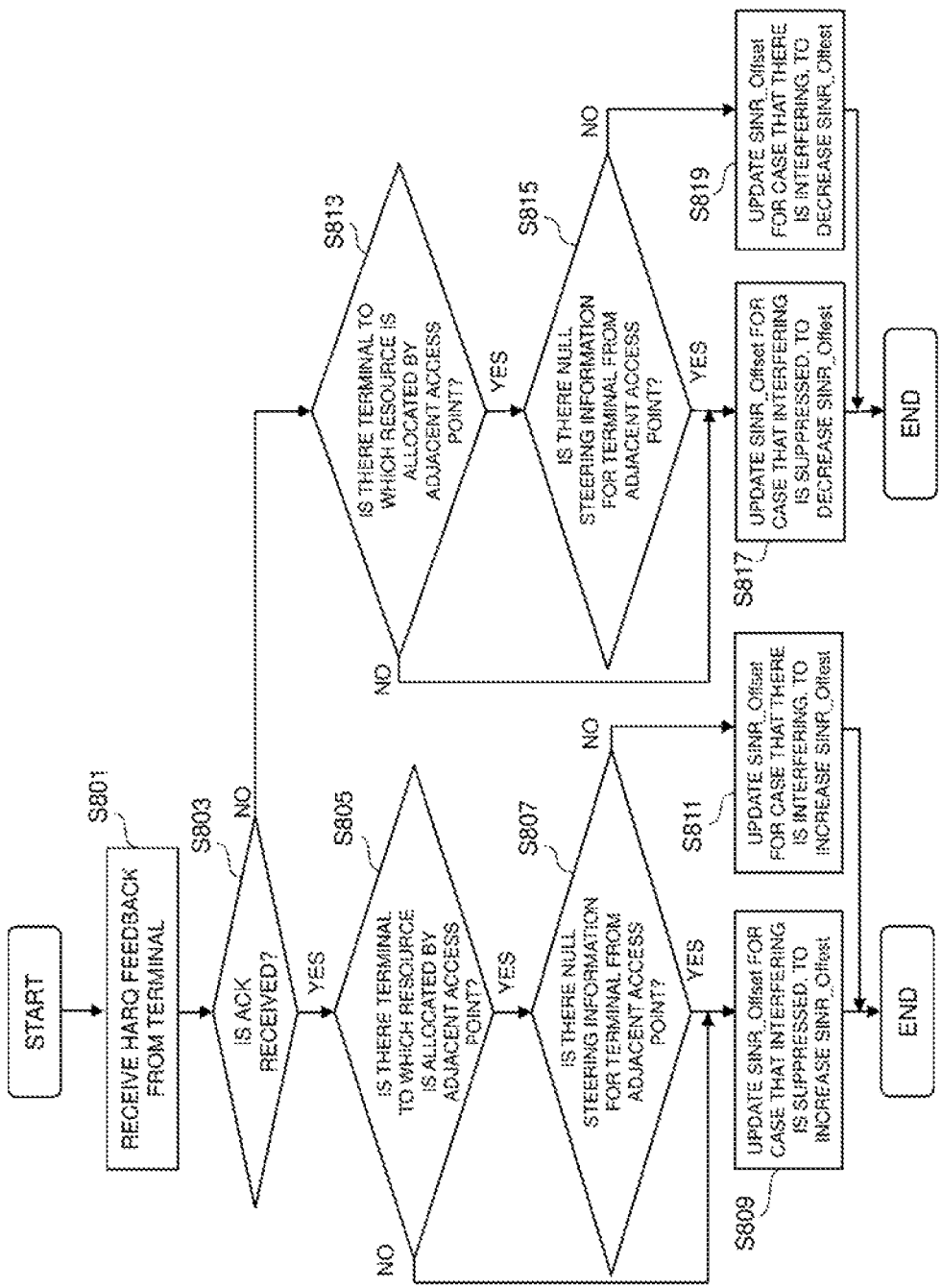
FIG. 8 is a flowchart illustrating operations of a schedule processing section for controlling the quality correction value SINR_Offset.

Next, a description will be given of an example of operations of the schedule processing section 400A at the time of receiving HARQ feedback information from the terminal apparatus 300, by using FIG. 8. FIG. 8 is a flowchart illustrating operations of the schedule processing section 400A for controlling the quality correction value SINR_Offset.

In Step S801, the schedule processing section 400A receives feedback information for downlink data transmission from the first terminal apparatus (e.g., the terminal apparatus 300A), and the process then advances to Step S803.

In Step S803, the schedule processing section 400A judges whether the received feedback information is ACK indicating reception success. If the received feedback information is ACK (S803: YES), the process advances to Step S805; if the received feedback information is not ACK (is NACK) (S803: NO), the process advances to Step S813.

In Step S805, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S805: YES), the process advances to Step S807; if there is not the second terminal apparatus to which a radio resource is allocated (S805: NO), the process advances to Step S809 without advancing to Step S807.

In Step S807, the schedule processing section 400A judges whether null steering information (first schedule information) indicating that null steering is to be performed for the first terminal apparatus (e.g., the terminal apparatus 300A) is received from the schedule processing section for the adjacent access point (e.g., the schedule processing section 400B for the access point 200B) via the obtaining section 131. If null steering information is received (S807: YES), the process advances to Step S809; if null steering information is not received (S809: NO), the process advances to Step S811.

In Step S809, the schedule processing section 400A updates SINR_Offset for the case that interfering is suppressed, so as to increase SINR_Offset, and then terminates the process illustrated in FIG. 8.

In Step S811, the schedule processing section 400A updates SINR_Offset for the case that there is interfering, so as to increase SINR_Offset, and then terminates the process illustrated in FIG. 8.

In contrast, in Step S813, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S813: YES), the process advances to Step S815; if there is not the second terminal apparatus to which a radio resource is allocated (S813: NO), the process advances to Step S817 without advancing to Step S815.

In Step S815, the schedule processing section 400A judges whether null steering information (first schedule information) indicating that null steering is to be performed for the first terminal apparatus (e.g., the terminal apparatus 300A) is received from the schedule processing section for the adjacent access point (e.g., the schedule processing section 400B for the access point 200B) via the obtaining section 131. If null steering information is received (S815:

YES), the process advances to Step S817; if null steering information is not received (S815: NO), the process advances to Step S819.

In Step S817, the schedule processing section 400A updates SINR_Offset for the case that interfering is suppressed, so as to increase SINR_Offset, and then terminates the process illustrated in FIG. 8.

In Step S819, the schedule processing section 400A updates SINR_Offset for the case that there is interfering, so as to increase SINR_Offset, and terminates the process illustrated in FIG. 8.

The first concrete example has been described above.

In a case that interference occurs between access points due to, for example, adjacent access points using the same frequency band, and a case of a system including multielement active antennas, interfering can be suppressed by using the beamforming technique, the null steering technique, or the like. However, it is judged whether interfering control is possible, based on restriction of the multiplexing order for users in the schedule process in adjacent access points. Hence, the BLER varies between a case that there is interfering and a case that there is no interfering, due to the difference in radio environment even if the same resource and the same modulation scheme are used. Hence, there arises a problem that an expected BLER value is not able to be obtained.

To address such a problem, according to the first concrete example, resource allocation information and null steering information (first schedule information) are transmitted and received between the schedule processing section 400A and the schedule processing section 400B, to be able to increase accuracy in estimation of communication quality. In other words, according to the first concrete example, it is possible to control, with high accuracy, the quality correction value STNR_Offset for obtaining the expected BLER.

(2) Second Concrete Example

In the second concrete example, coordinated control in which transmissions are performed by a plurality of access points at the same timing, as in the JT.

Figure 9:
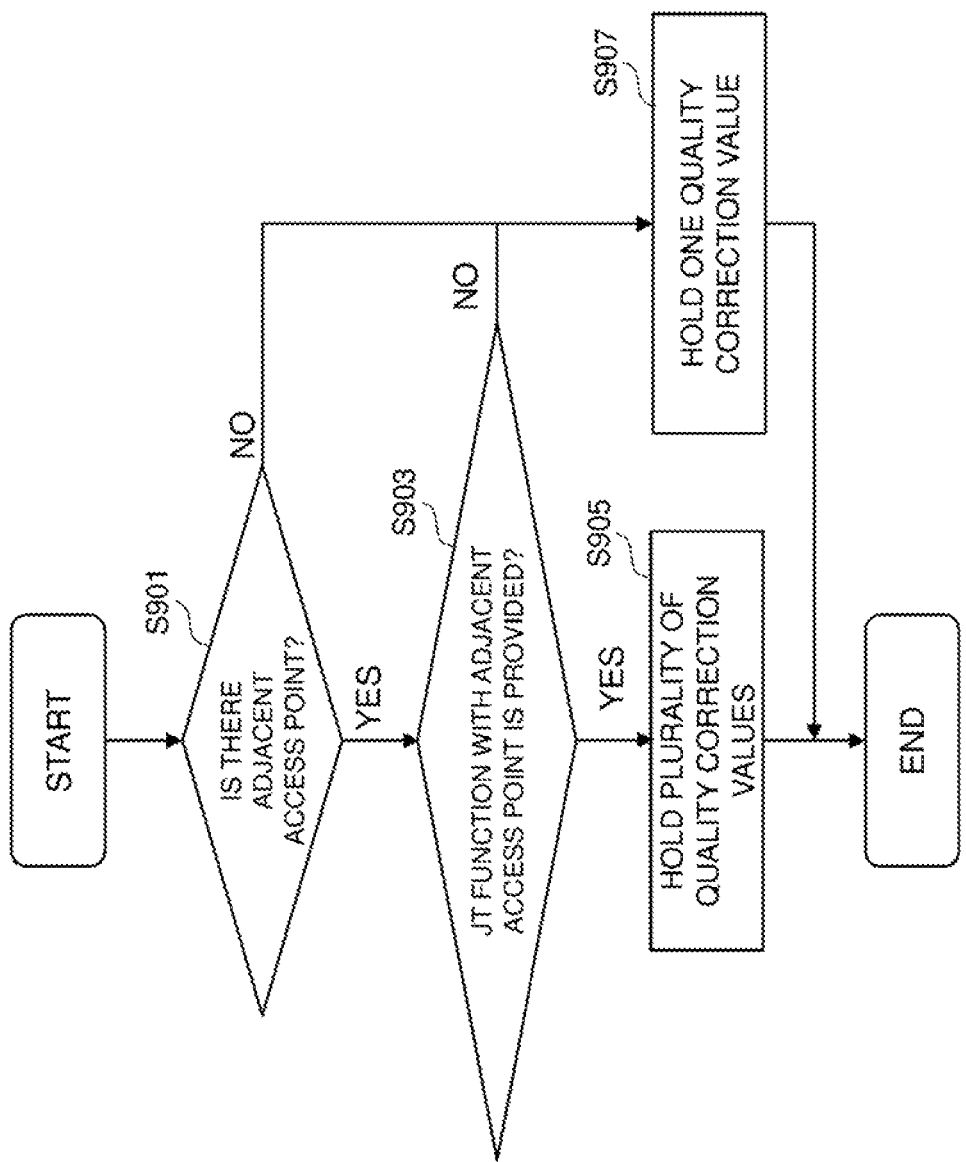
FIG. 9 is a flowchart illustrating an operation example of the quality correction value calculation process by the reception error estimation processing section.

FIG. 9 is a flowchart illustrating an operation example of a quality correction value calculation process by the reception error estimation processing section 411.

In Step S901, after determining the first terminal apparatus (e.g., the terminal apparatus 300A) for the access point 200A, the reception error estimation processing section 411 judges whether there is an adjacent access point (e.g., the access point 200B). If there is an adjacent access point (S901: YES), the process advances to Step S903; if there is no adjacent access point (S901: NO), the process advances to Step S907.

In Step S903, the reception error estimation processing section 411 judges whether a JT function with the adjacent access point (e.g., the access point 200B) is provided. If the JT function is provided (S903: YES), the process advances to Step S905; if the JT function is not provided (S903: NO), the process advances to Step S907.

In Step S905, the reception error estimation processing section 411 holds a plurality of quality correction values SINR_Offset and then terminates the process illustrated in FIG. 9.

In Step S907, the reception error estimation processing section 411 holds one quality correction value SINR_Offset and then terminates the process illustrated in FIG. 9.

Figure 10:
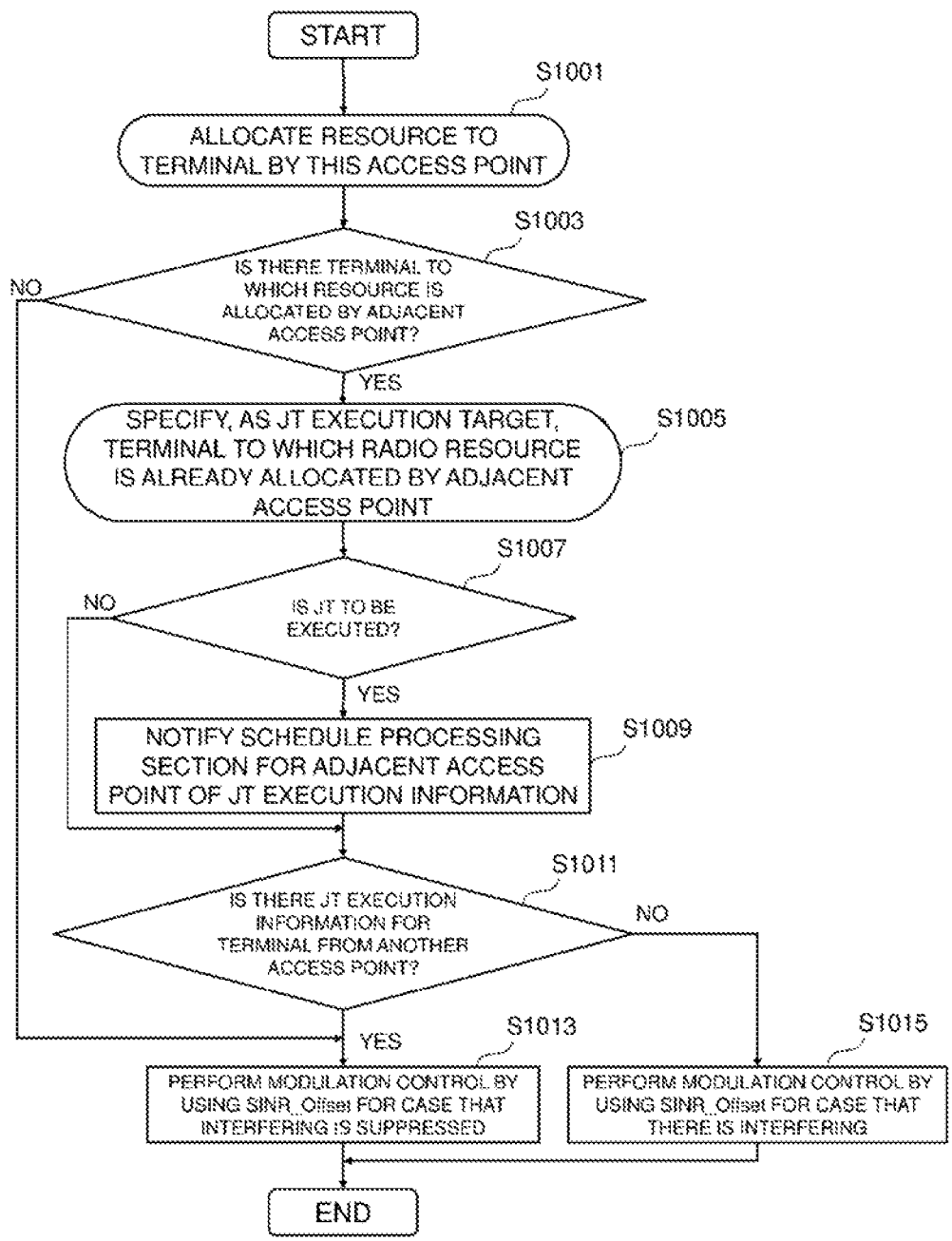
FIG. 10 is a flowchart illustrating resource allocation operation, operation related to a JT function, and operation for making a judgment for the quality correction value SINR_Offset.

Next, a description will be given of operations at the time of resource allocation according to the present concrete example by using FIG. 10. FIG. 10 is a flowchart illustrating resource allocation operation, operation related to the JT function, and operation for making a judgment for the quality correction value SINR_Offset.

In Step S1001, the resource allocation section 413 performs allocation of a radio resource to the first terminal apparatus (e.g., the terminal apparatus 300A) performing radio communication with the access point 200A managed by the schedule processing section 400A, and the process then advances to Step S1003.

In Step S1003, the schedule processing section 400A judges whether a radio resource is allocated to the second terminal apparatus (e.g., the terminal apparatus 300B) by the adjacent access point (e.g., the access point 200B). If such a radio resource is allocated (S1003: YES), the process advances to Step S1005. In contrast, if such a radio resource is not allocated (S1003: NO), the process advances to Step S1013 without advancing to Steps S1005 to S1009 by assuming that there is no interference for the access point 200A from the adjacent access point (e.g., the access point 200B).

In Step S1005, the schedule processing section 400A specifies, as a JT execution target between the access points 200A and 200B, the second terminal apparatus (e.g., the terminal apparatus 300B) for which data transmission using the radio resource from adjacent access point (e.g., the access point 200B) is already determined, and the process then advances to Step S1007.

In Step S1007, the schedule processing section 400A judges whether to execute the JT for the second terminal apparatus (e.g., the terminal apparatus 300B) for which data transmission using the radio resource from the adjacent access point (e.g., the access point 200B) is already determined. If the JT is to be executed (S1007: YES), the process advances to Step S1009; if the JT is not to be executed (S1007: NO), the process advances to Step S1011 without advancing to Step S1009.

In Step S1009, the information generation section 415 generates JT execution information indicating that the JT is to be executed. The information notification section 417 then notifies the schedule processing section 400B of the generated JT execution information, for example, via the obtaining section 131, and the process then advances to Step S1011.

In Step S1011, the schedule processing section 400A judges whether the JT execution information (first schedule information) indicating that the JT is to be performed for the first terminal apparatus (e.g., the terminal apparatus 300A) is received from the schedule processing section for the adjacent access point (e.g., the schedule processing section 400B for the access point 200B) via the obtaining section 131. If the JT execution information is received (S1011: YES), the process advances to Step S1013; if the JT execution information is not received (S1011: NO), the process advances to Step S1015.

In Step S1013, the schedule processing section 400A performs modulation control (control related to the second schedule) such as determination of a modulation scheme, for example, based on SINR estimated by using SINR_Offset for the case that interfering is suppressed, for the first terminal apparatus (e.g., the terminal apparatus 300A), and then terminates the process illustrated in FIG. 10.

In Step S1015, the schedule processing section 400A performs modulation control (control related to the second schedule) such as determination of a modulation scheme, for example, based on SINR estimated by using SINR_Offset for the case that there is interfering, for the first terminal apparatus (e.g., the terminal apparatus 300A), and then terminates the process illustrated in FIG. 10.

Figure 11:
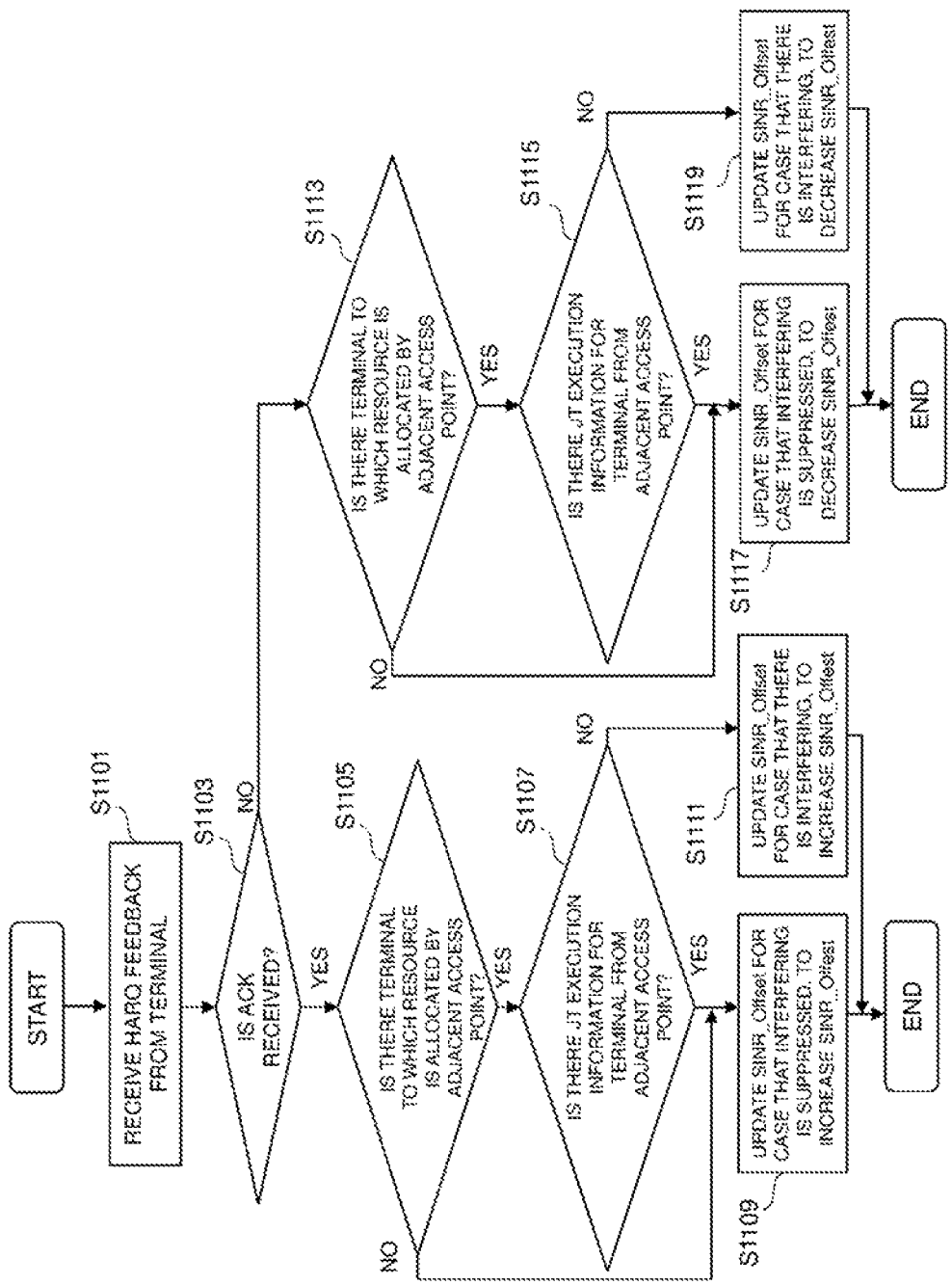
FIG. 11 is a flowchart illustrating the operations of the schedule processing section for controlling the quality correction value SINR_Offset.

Next, a description will be given of an example of operations of the schedule processing section 400A at the time of receiving HARQ feedback information from the terminal apparatus 300, with reference to FIG. 11. FIG. 11 is a flowchart illustrating operations of the schedule processing section 400A for controlling the quality correction value SINR_Offset.

In Step S1101, the schedule processing section 400A receives feedback information for downlink data transmission from the first terminal apparatus (e.g., the terminal apparatus 300A), and the process then advances to Step S1103.

In Step S1103, the schedule processing section 400A judges whether the received feedback information is ACK indicating reception success. If the received feedback information is ACK (S1103: YES), the process advances to Step S1105; if the received feedback information is not ACK (is NACK) (S1103: NO), the process advances to Step S1113.

In Step S1105, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S1105: YES), the process advances to Step S1107; if there is not the second terminal apparatus to which a radio resource is allocated by the adjacent access point (S1105: NO), the process advances to Step S1109 without advancing to Step S1107.

In Step S1107, the schedule processing section 400A judges whether the JT execution information (first schedule information) indicating that the JT is to be performed for the first terminal apparatus (e.g., the terminal apparatus 300A) is received from the schedule processing section for the adjacent access point (e.g., the schedule processing section 400B for the access point 200B) via the obtaining section 131. If the JT execution information is received (S1107: YES), the process advances to Step S1109; if the JT execution information is not received (S1109: NO), the process advances to Step S1111.

In Step S1109, the schedule processing section 400A updates SINR_Offset for the case that interfering is suppressed, so as to increase SINR_Offset, and then terminates the process illustrated in FIG. 11.

In Step S1111, the schedule processing section 400A updates SINR_Offset for the case that there is interfering, so as to increase SINR_Offset, and then terminates the process illustrated in FIG. 11.

In contrast, in Step S1113, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S1113: YES), the process advances to Step S1115; if there is not the second terminal apparatus to which a radio resource is allocated by the adjacent access point (S1113: NO), the process advances to Step S1117 without advancing to Step S1115.

In Step S1115, the schedule processing section 400A judges whether the JT execution information (first schedule information) indicating that the JT is to be performed for the first terminal apparatus (e.g., the terminal apparatus 300A) is received from the schedule processing section for the adjacent access point (e.g., the schedule processing section 400B for the access point 200B) via the obtaining section 131. If the JT execution information is received (S1115: YES), the process advances to Step S1117; if the JT execution information is not received (S1115: NO), the process advances to Step S1119.

In Step S1117, the schedule processing section 400A updates SINR_Offset for the case that interfering is suppressed, so as to decrease SINR_Offset, and then terminates the process illustrated in FIG. 11.

In Step S1118, the schedule processing section 400A updates SINR_Offset for the case that there is interfering, so as to decrease SINR_Offset, and then terminates the process illustrated in FIG. 11.

The second concrete example has been described above.

According to the second concrete example, resource allocation information and JT execution information (first schedule information) are transmitted and received between the schedule processing section 400A and the schedule processing section 400B, to be able to increase accuracy in estimation of communication quality. In other words, according to the second concrete example, it is possible to control, with high accuracy, the quality correction value SINR_Offset for obtaining the expected BLER.

(3) Third Concrete Example

In the third concrete example, as in the JR, the access points 200A and 200B coordinate with each other to perform coordinated control for the plurality of access points 200A and 200B to receive data from the first terminal apparatus (e.g., the terminal apparatus 300A) simultaneously.

Figure 12:
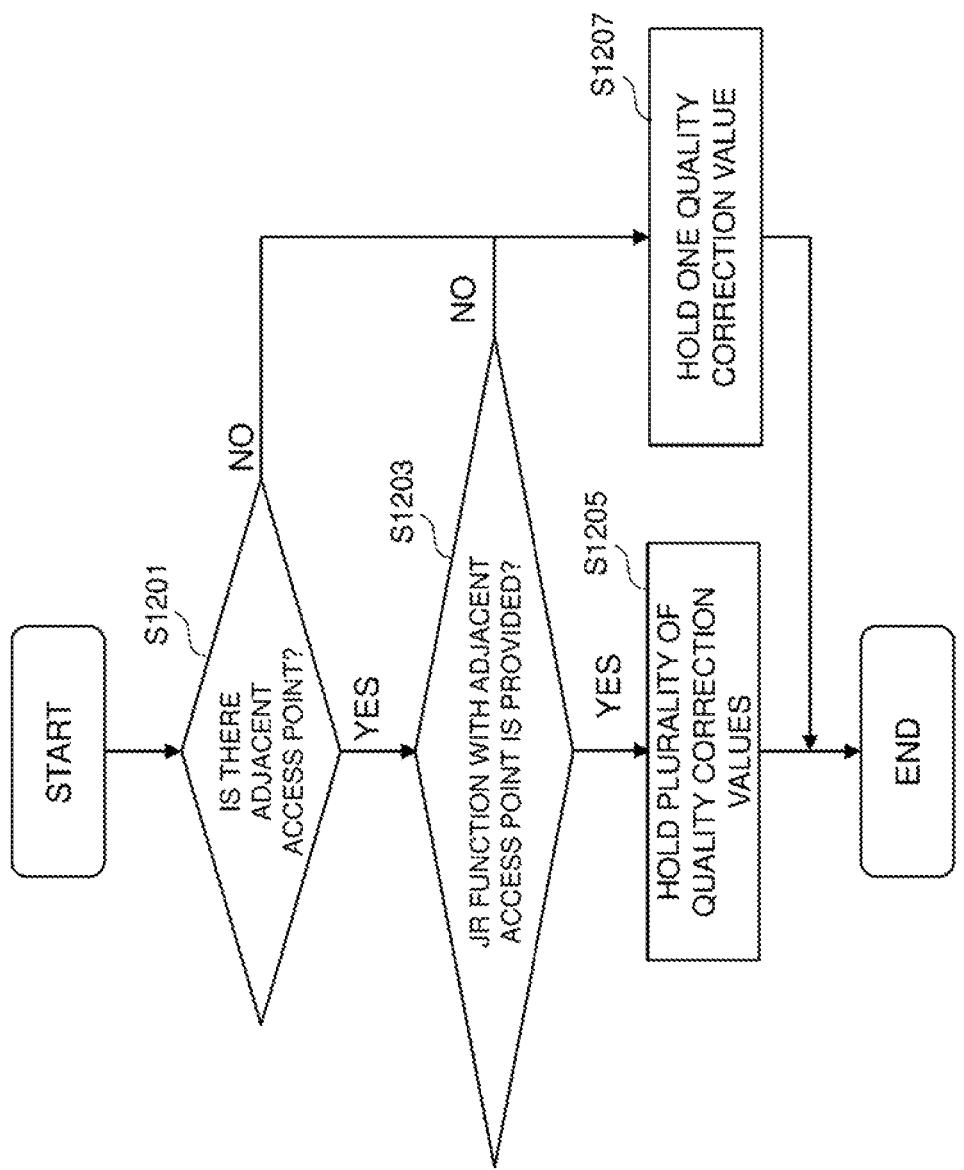
FIG. 12 is a flowchart illustrating an operation example of the quality correction value calculation process by the reception error estimation processing section.

FIG. 12 is a flowchart illustrating an operation example of a quality correction value calculation process by the reception error estimation processing section 411.

In Step S1201, after determining the first terminal apparatus (e.g., the terminal apparatus 300A) for the access point 200A, the reception error estimation processing section 411 judges whether there is an adjacent access point (e.g., the access point 200B). If there is an adjacent access point (S1201: Yes), the process advances to Step S1203; if there is no adjacent access point (S1201: No), the process advances to Step S1207.

In Step S1203, the reception error estimation processing section 411 judges whether a JR function with the adjacent access point (e.g., the access point 200B) is provided. If the JR function is provided (S1203: YES), the process advances to Step S1205; if the JR function is not provided (S1203: NO), the process advances to Step S1207 without advancing to Step S1205.

In Step S1205, the reception error estimation processing section 411 holds a plurality of quality correction values SINR_Offset and then terminates the process illustrated in FIG. 12.

In Step S1207, the reception error estimation processing section 411 holds one quality correction value SINR_Offset and then terminates the process illustrated in FIG. 12.

Figure 13:
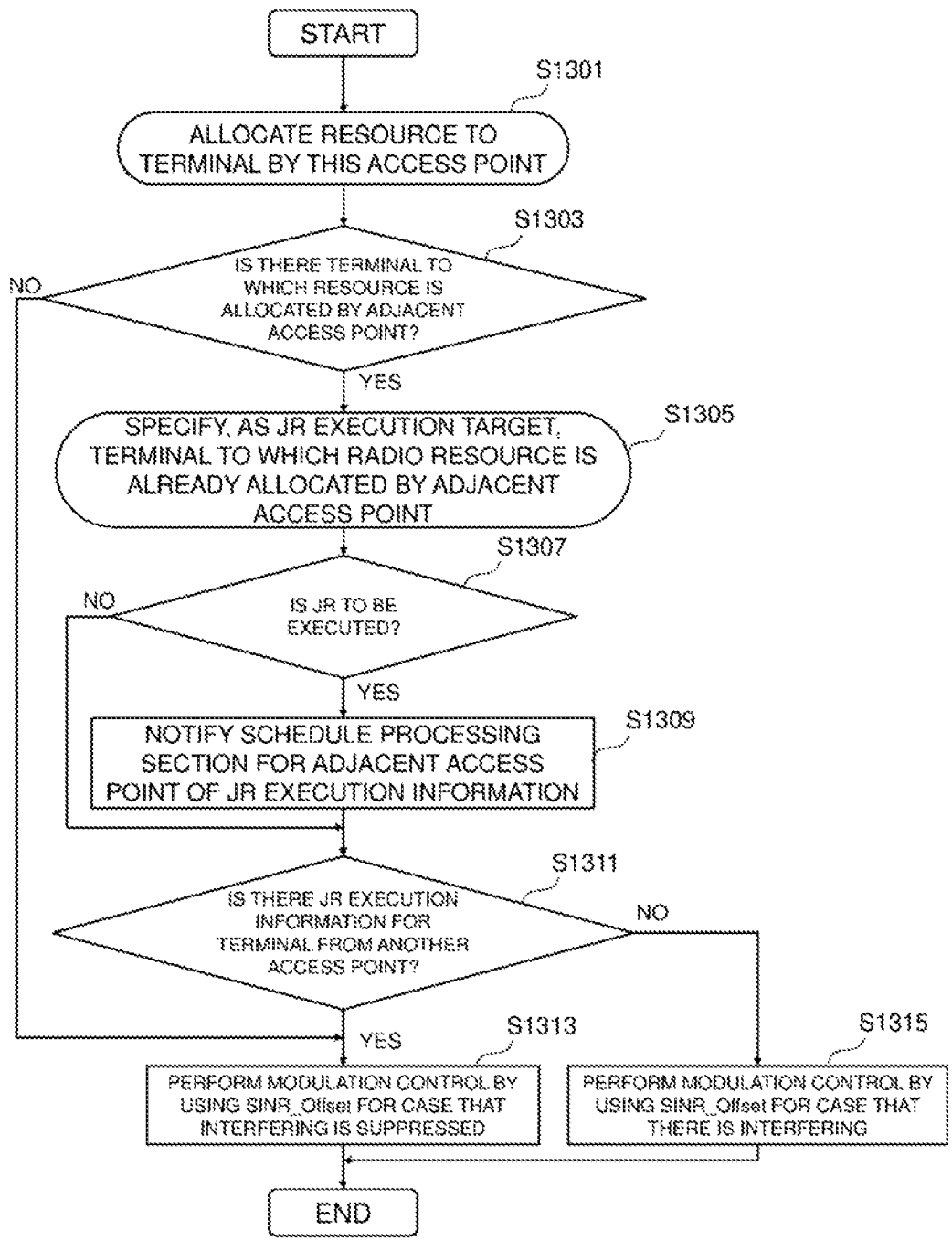
FIG. 13 is a flowchart illustrating resource allocation operation, operation related to a JR function, and operation for making a judgment for the quality correction value SINR_Offset.

Next, a description will be given of operations at the time of resource allocation according to the present concrete example by using FIG. 13. FIG. 13 is a flowchart illustrating resource allocation operation, operation related to the JR function, and operation for making a judgment for the quality correction value SINR_Offset.

In Step S1301, the resource allocation section 413 allocates a radio resource to the first terminal apparatus (e.g., the terminal apparatus 300A), based on check result information related to cyclic redundancy code (CRC) of uplink data that the access point 200A has received from the first terminal apparatus (e.g., the terminal apparatus 300A), and the process then advances to Step S1303.

In Step S1303, the schedule processing section 400A judges whether a radio resource is allocated to the second terminal apparatus (e.g., the terminal apparatus 300B) by the adjacent access point (e.g., the access point 200B). If such a radio resource is allocated (S1303: YES), the process advances to Step S1305. In contrast, if such a radio resource is not allocated (S1303: NO), the process advances to Step S1313 without advancing to Steps S1305 to S1309 by assuming that there is no interfering for the access point 200A from the adjacent access point (e.g., the access point 200B).

In Step S1305, the schedule processing section 400A specifies, as a JR execution target between the access points 200A and 200B, the second terminal apparatus (e.g., the terminal apparatus 300B) for which data reception using the radio resource from adjacent access point (e.g., the access point 200B) is already determined, and the process then advances to Step S1307.

In Step S1307, the schedule processing section 400A judges whether to execute the JR for the second terminal apparatus (e.g., the terminal apparatus 300B) for which data reception using the radio resource from the adjacent access point (e.g., the access point 200B) is already determined. If the JR is to be executed (S1307: YES), the process advances to Step S1009; if the JR is not to be executed (S1307: NO), the process advances to Step S1311 without advancing to Step S1309.

In Step S1309, the information generation section 415 generates JR execution information indicating that the JR is to be executed. The information notification section 417 then notifies the schedule processing section 400B of the generated JR execution information, for example, via the obtaining section 131, and the process then advances to Step S1311.

In Step S1311, the schedule processing section 400A judges whether the JR execution information (first schedule information) indicating that the JR is to be executed for the first terminal apparatus (e.g., the terminal apparatus 300A) is received from the schedule processing section for the adjacent access point (e.g., the schedule processing section 400B for the access point 200B) via the obtaining section 131. If the JR execution information is received (S1311: YES), the process advances to Step S1313; if the JR execution information is not received (S1311: NO), the process advances to Step S1315.

In Step S1313, the schedule processing section 400A performs modulation control (control related to the second schedule) such as determination of a modulation scheme, for example, based on SINR estimated by using SINR_Offset for the case that interfering is suppressed, for the first terminal apparatus (e.g., the terminal apparatus 300A), and then terminates the process illustrated in FIG. 13.

In Step S1315, the schedule processing section 400A performs modulation control (control related to the second schedule) such as determination of a modulation scheme, for example, based on SINR estimated by using SINR_Offset for the case that there is interfering, for the first terminal apparatus (e.g., the terminal apparatus 300A), and then terminates the process illustrated in FIG. 13.

Figure 14:
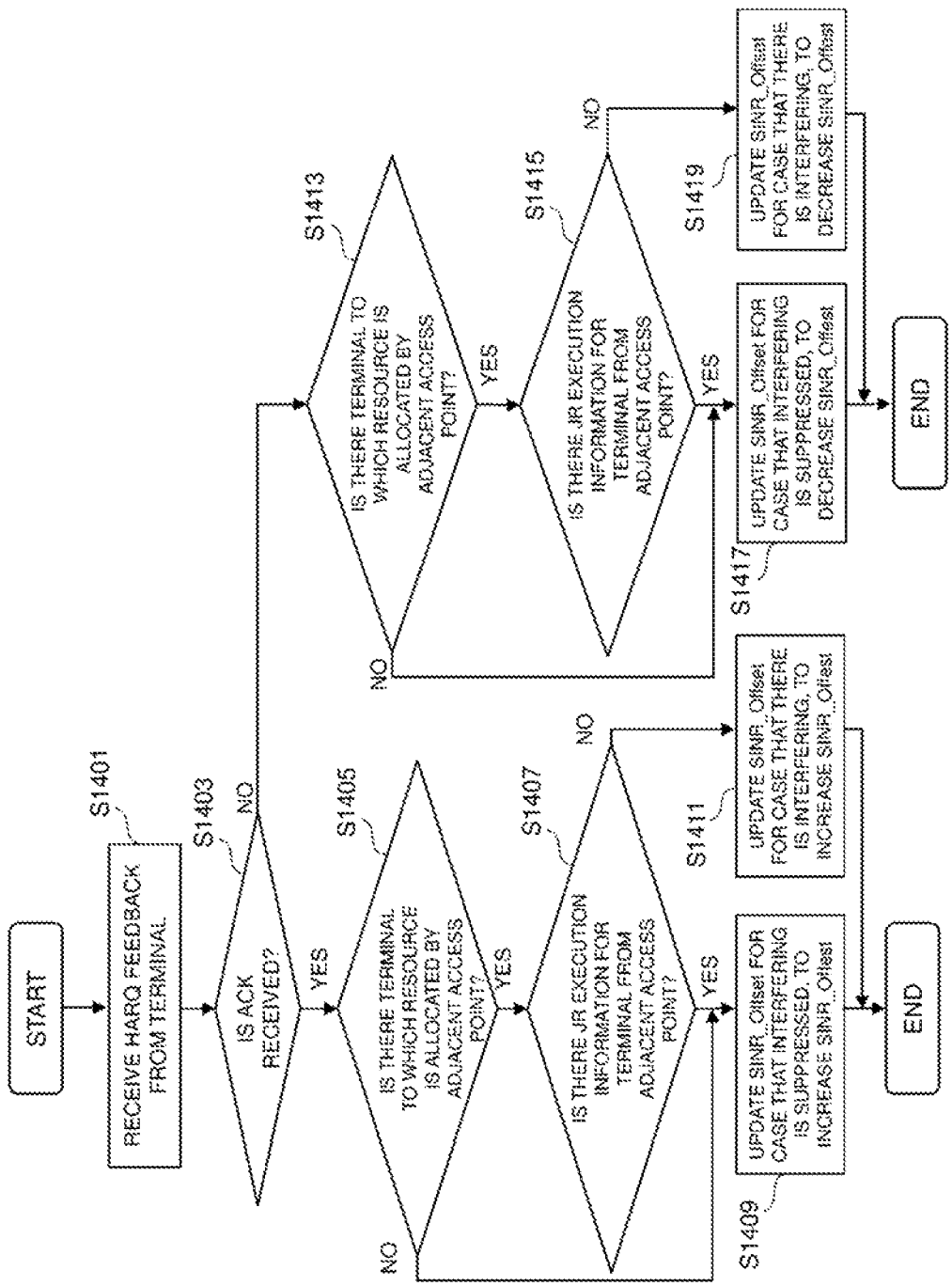
FIG. 14 is a flowchart illustrating operations of a schedule processing section 400A for controlling the quality correction value SINR_Offset.

Next, a description will be given of an example of operations of the schedule processing section 400A at the time of receiving HARQ feedback information from the terminal apparatus 300, by using FIG. 14. FIG. 14 is a flowchart illustrating operations of the schedule processing section 400A for controlling the quality correction value SINR_Offset.

In Step S1401, the schedule processing section 400A receives feedback information included in uplink data from the first terminal apparatus (e.g., the terminal apparatus 300A), and the process then advances to Step S1403.

In Step S1403, the schedule processing section 400A judges whether the received feedback information is ACK indicating reception success. If the received feedback information is ACK (S1403: YES), the process advances to Step S1405; if the received feedback information is not ACK (is NACK) (S1403: NO), the process advances to Step S1413.

In Step S1405, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S1405: YES), the process advances to Step S1407; if there is not the second terminal apparatus to which a radio resource is allocated by the adjacent access point (S1405: NO), the process advances to Step S1409 without advancing to Step S1407.

In Step S1407, the schedule processing section 400A judges whether JR execution information (first schedule information) indicating that the JR is to be performed for the first terminal apparatus (e.g., the terminal apparatus 300A) is received from the schedule processing section for the adjacent access point (e.g., the schedule processing section 400B for the access point 200B) via the obtaining section 131. If the JR execution information is received (S1407: YES), the process advances to Step S1409; if the JR execution information is not received (S1409: NO), the process advances to Step S1411.

In Step S1409, the schedule processing section 400A updates SINR_Offset for the case that interfering is suppressed, so as to increase SINR_Offset, and then terminates the process illustrated in FIG. 14.

In Step S1411, the schedule processing section 400A updates SINR_Offset for the case that there is interfering, so as to increase SINR_Offset, and then terminates the process illustrated in FIG. 14.

In contrast, in Step S1413, at the time of allocating a radio resource to the first terminal apparatus (e.g., the terminal apparatus 300A) according to the feedback information, the schedule processing section 400A judges whether there is the second terminal apparatus (e.g., the terminal apparatus 300B) to which a radio resource is allocated by the adjacent access point (e.g., the access point 200B). If there is the second terminal apparatus to which a radio resource is allocated by the adjacent access point (S1413: YES), the process advances to Step S1415; if there is not the second terminal apparatus to which a radio resource is allocated by the adjacent access point (S1413: NO), the process advances to Step S1417 without advancing to Step S1415.

In Step S1415, the schedule processing section 400A judges whether JR execution information (first schedule information) indicating that the JR is to be performed for the first terminal apparatus (e.g., the terminal apparatus 300A) is received from the schedule processing section for the adjacent access point (e.g., the schedule processing section 400B for the access point 200B) via the obtaining section 131. If the JR execution information is received (S1415: YES), the process advances to Step S1417; if the JR execution information is not received (S1415: NO), the process advances to Step S1419.

In Step S1417, the schedule processing section 400A updates SINR_Offset for the case that interfering is suppressed, so as to decrease SINR_Offset, and then terminates the process illustrated in FIG. 14.

In Step S1419, the schedule processing section 400A updates SINR_Offset for the case that there is interfering, so as to decrease SINR_Offset, and then terminates the process illustrated in FIG. 14.

The third concrete example has been described above.

According to the third concrete example, resource allocation information and JR execution information (first schedule information) are transmitted and received between the schedule processing section 400A and the schedule processing section 400B, to be able to increase accuracy in estimation of communication quality. In other words, according to the third concrete example, it is possible to control, with high accuracy, the quality correction value SINR_Offset for obtaining the expected BLER.

5. Second Example Embodiment

Next, a description will be given of a second example embodiment of the present invention. The above-described first example embodiment is a concrete example embodiment, whereas the second example embodiment is a more generalized example embodiment.

5.1. Configuration of Control Apparatus

Figure 15:
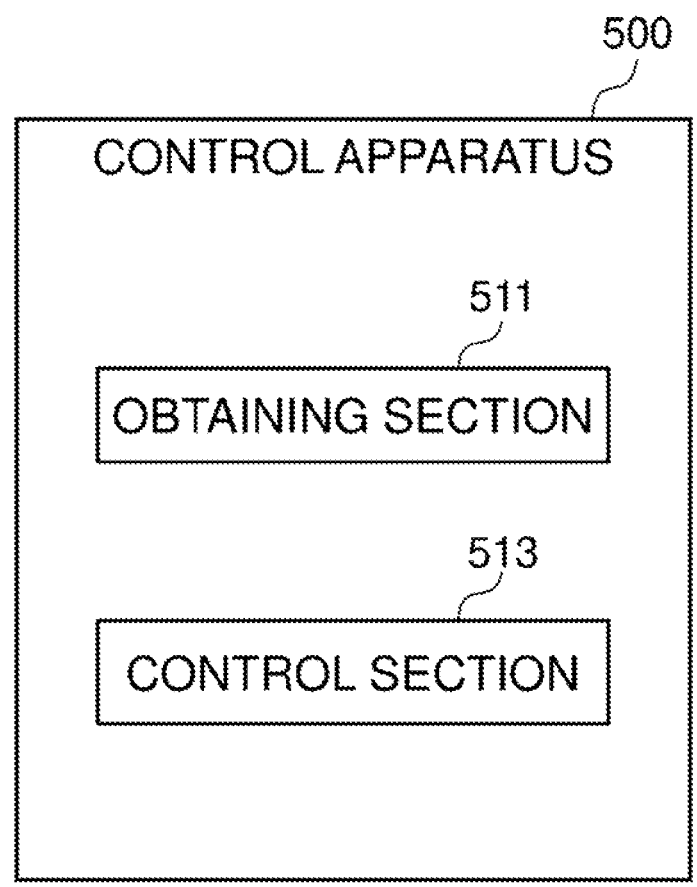
FIG. 15 is a block diagram illustrating an example of a schematic configuration of a control apparatus according to a second example embodiment.

First, with reference to FIG. 15, an example of a configuration of a control apparatus 500 according to the second example embodiment will be described. FIG. 15 is a block diagram illustrating an example of a schematic configuration of the control apparatus 500 according to the second example embodiment. With reference to FIG. 15, the control apparatus 500 includes an obtaining section 511 and a control section 513. Specific operations of the obtaining section 511 and the control section 513 will be described later.

The obtaining section 511 and the control section 513 may be implemented with the same processor or may be implemented with separate processors. The obtaining section 511 and the control section 513 may include a memory configured to store a program (instructions) and one or more processors that can execute the program (instructions), and the one or more processors may perform operations of the obtaining section 511 and the control section 513. The program may be a program for causing the processor(s) to execute the operations of the obtaining section 511 and the control section 513.

5.2. Technical Features

Next, technical features of the second example embodiment will be described.

In the second example embodiment, the control apparatus 500 (obtaining section 511) obtains information related to a first schedule for coordinated control between a first radio base station and a second radio base station. The control apparatus 500 (control section 513) performs control related to a second schedule for the first radio base station to perform radio communication with a first terminal apparatus, based on the information related to the first schedule.

For example, the obtaining section 511 may perform operations of the obtaining section 131 according to the above-described first example embodiment. The control section 513 may perform operations of the control section 133 according to the above-described first example embodiment.

The second example embodiment has been described above. According to the second example embodiment, it is possible, for example, for a radio base station (e.g., the first radio base station) performing coordinated control with another radio base station (e.g., the second radio base station), to appropriately perform scheduling for radio communication with a terminal apparatus.

6. Other Aspects

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not be necessarily performed in the order described in the corresponding sequence diagram in time series. For example, the steps in the processing may be performed in parallel. In addition, some of the steps in the processing may be deleted, or more steps may be added to the processing.

An apparatus including constituent elements (e.g., the obtaining section and/or the control section) of the central base station described in the Specification (e.g., one or more apparatuses (or units) among a plurality of apparatuses (or units) constituting the central base station or a module for one of the plurality of apparatuses (or units)) may be provided.

Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A control apparatus comprising:

an obtaining section configured to obtain information related to a first schedule for coordinated control between a first radio base station and a second radio base station; and a control section configured to perform control related to a second schedule for the first radio base station to perform radio communication with a first terminal apparatus, based on the information related to the first schedule.

(Supplementary Note 2)

The control apparatus according to Supplementary Note 1, wherein the coordinated control is control for transmitting data to the first terminal apparatus with a beam formed by one of the first radio base station and the second radio base station at each transmission timing.

(Supplementary Note 3)

The control apparatus according to Supplementary Note 2, wherein the information related to the first schedule includes information indicating whether the second radio base station performs null steering for the first terminal apparatus.

(Supplementary Note 4)

The control apparatus according to Supplementary Note 1, wherein the information related to the first schedule includes information indicating whether the first radio base station and the second radio base station simultaneously transmit data to the first terminal apparatus.

(Supplementary Note 5)

The control apparatus according to Supplementary Note 1, wherein the information related to the first schedule includes information indicating whether the first terminal apparatus simultaneously transmits data to the first radio base station and the second radio base station.

(Supplementary Note 6)

The control apparatus according to any one of Supplementary Notes 1 to 5, wherein the control section is configured to allocate a radio resource for radio communication performed with the first terminal apparatus by the first radio base station; and perform control related to the second schedule for the first radio base station to perform radio communication with the first terminal apparatus, based on the information related to the first schedule.

(Supplementary Note 7)

The control apparatus according to Supplementary Note 6, wherein the information related to the first schedule includes information indicating whether the second radio base station allocates a radio resource to a second terminal apparatus.

(Supplementary Note 8)

The control apparatus according to any one of Supplementary Notes 1 to 5, wherein the control related to the second schedule includes radio resource allocation for the first radio base station to perform radio communication with the first terminal apparatus.

(Supplementary Note 9)

The control apparatus according to any one of Supplementary Notes 1 to 8, wherein the control related to the second schedule includes determination of data modulation for transmission to the first terminal apparatus.

(Supplementary Note 10)

The control apparatus according to any one of Supplementary Notes 1 to 9, wherein the control section is configured to estimate communication quality between the first radio base station and the first terminal apparatus, based on the information related to the first schedule; and perform the control related to the second schedule for the first radio base station to perform radio communication with the first terminal apparatus, using estimated communication quality.

(Supplementary Note 11)

A method comprising:

obtaining information related to a first schedule for coordinated control between a first radio base station and a second radio base station; and performing control related to a second schedule for radio communication performed with a first terminal apparatus by the first radio base station, based on the information related to the first schedule.

(Supplementary Note 12)

A program that causes a processor to:

obtain information related to a first schedule for coordinated control between a first radio base station and a second radio base station; and perform control related to a second schedule for the first radio base station to perform radio communication with a first terminal apparatus, based on the information related to the first schedule.

(Supplementary Note 13)

A computer-readable non-transitory recording medium having recorded thereon a program that causes a processor to:

obtain information related to a first schedule for coordinated control between a first radio base station and a second radio base station; and perform control related to a second schedule for the first radio base station to perform radio communication with a first terminal apparatus, based on the information related to the first schedule.

INDUSTRIAL APPLICABILITY

It is possible for a radio base station performing coordinated control with another radio base station, to appropriately perform scheduling for radio communication with a terminal apparatus, in a mobile communication system.

REFERENCE SIGNS LIST

1 System
100 Central Base Station
200, 200A, 200B Access Point
300, 300A, 300B, 300C Terminal Apparatus
500 Control Apparatus
131, 511 Obtaining Section
133, 513 Control Section

What is claimed is:

1. A control apparatus comprising:
a memory storing instructions; and
one or more processors configured to execute the instructions to obtain information related to a first schedule for coordinated control between a first radio base station and a second radio base station;
estimate a communication quality between the first radio base station and a first terminal apparatus, with a first quality correction value based on the information related to the first schedule, when a communication interference between the first radio base station and the first terminal apparatus has been suppressed by a signal from the second radio base station, or with a second quality correction value based on the information related to the first schedule, when the communication interference has not been suppressed by the signal;
perform control related to a second schedule for the first radio base station to perform radio communication with a first terminal apparatus, based on the communication quality;
update by increasing the first quality correction value when there is no second terminal apparatus to which radio resources have been allocated by the second radio base station, or when there is the second terminal apparatus to which radio resources have been allocated by the second radio base station and the information related to the first schedule has been received, in the case where the one or more processors has received notification from the first terminal apparatus about success of reception, of a data that has been transmitted from the first radio base station to the first terminal apparatus;

update by increasing the second quality correction value when there is the second terminal apparatus to which radio resources have been allocated by the second radio base station and the information related to the first schedule has not been received, in the case where the one or more processors has received notification from the first terminal apparatus about success of reception, of the data;

update by decreasing the first quality correction value when there is no second terminal apparatus to which radio resources have been allocated by the second radio base station, or when there is the second terminal apparatus to which radio resources have been allocated by the second radio base station and the information related to the first schedule has been received, in the case where the one or more processors has received a notification from the first terminal apparatus about reception error from the first terminal apparatus, of the data; and update by decreasing the second quality correction value when there is the second terminal apparatus to which radio resources have been allocated by the second radio base station and the information related to the first schedule has not been received, in the case where the one or more processors has received a notification from the first terminal apparatus about reception error from the first terminal apparatus, of the data.

2. The control apparatus according to claim 1, wherein the coordinated control is control for transmitting data to the first terminal apparatus with a beam formed by one of the first radio base station and the second radio base station at each trans mission timing.

3. The control apparatus according to claim 2, wherein the information related to the first schedule includes information indicating whether the second radio base station performs null steering for the first terminal apparatus.

4. The control apparatus according to claim 1, wherein the information related to the first schedule includes information indicating whether the first radio base station and the second radio base station simultaneously transmit data to the first terminal apparatus.

5. The control apparatus according to claim 1, wherein the information related to the first schedule includes information indicating whether the first terminal apparatus simultaneously transmits data to the first radio base station and the second radio base station.

6. The control apparatus according to claim 1, wherein the one or more processors configured to execute the instructions to
    allocate a radio resource for radio communication performed with the first terminal apparatus by the first radio base station; and
    perform control related to the second schedule for the first radio base station to perform radio communication with the first terminal apparatus, based on the information related to the first schedule.

7. The control apparatus according to claim 6, wherein the information related to the first schedule includes information indicating whether the second radio base station allocates a radio resource to a second terminal apparatus.

8. The control apparatus according to claim 1, wherein the control related to the second schedule includes radio resource allocation for the first radio base station to perform radio communication with the first terminal apparatus.

9. The control apparatus according to claim 1, wherein the control related to the second schedule includes determination of data modulation for transmission to the first terminal apparatus.

10. A method comprising:
    obtaining information related to a first schedule for coordinated control between a first radio base station and a second radio base station;
    estimating a communication quality between the first radio base station and a first terminal apparatus, with a first quality correction value based on the information related to the first schedule, upon determining a communication interference between the first radio base station and the first terminal apparatus has been suppressed by a signal from the second radio base station, or with a second quality correction value based on the information related to the first schedule, upon determining the communication interference has not been suppressed by the signal;
    performing control related to a second schedule for radio communication performed with a first terminal apparatus by the first radio base station, based on the communication quality;
    updating by increasing the first quality correction value upon determining there is no second terminal apparatus to which radio resources have been allocated by the second radio base station, or upon determining there is the second terminal apparatus to which radio resources have been allocated by the second radio base station and the information related to the first schedule has been received, in the case where the one or more processors has received notification from the first terminal apparatus about success of reception, of a data that has been transmitted from the first radio base station to the first terminal apparatus;
    updating by increasing the second quality correction value upon determining there is the second terminal apparatus to which radio resources have been allocated by the second radio base station and the information related to the first schedule has not been received, in the case where the one or more processors has received notification from the first terminal apparatus about success of reception, of the data;
    updating by decreasing the first quality correction value upon determining there is no second terminal apparatus to which radio resources have been allocated by the second radio base station, or upon determining there is the second terminal apparatus to which radio resources have been allocated by the second radio base station and the information related to the first schedule has been received, in the case where the one or more processors has received a notification from the first terminal apparatus about reception error from the first terminal apparatus, of the data; and
    updating by decreasing the second quality correction value upon determining there is the second terminal apparatus to which radio resources have been allocated by the second radio base station and the information related to the first schedule has not been received, in the case where the one or more processors has received a notification from the first terminal apparatus about reception error from the first terminal apparatus, of the data.

11. A computer-readable non-transitory recording medium having recorded thereon a program that causes a processor to:
- obtain information related to a first schedule for coordinated control between a first radio base station and a second radio base station;
- estimate a communication quality between the first radio base station and a first terminal apparatus, with a first quality correction value based on the information related to the first schedule, when a communication interference between the first radio base station and the first terminal apparatus has been suppressed by a signal from the second radio base station, or with a second quality correction value based on the information related to the first schedule, when the communication interference has not been suppressed by the signal;
- perform control related to a second schedule for the first radio base station to perform radio communication with a first terminal apparatus, based on the communication quality,
- update by increasing the first quality correction value when there is no second terminal apparatus to which radio resources have been allocated by the second radio base station, or when there is the second terminal apparatus to which radio resources have been allocated by the second radio base station and the information related to the first schedule has been received, in the case where the one or more processors has received notification from the first terminal apparatus about success of reception, of a data that has been transmitted from the first radio base station to the first terminal apparatus;
- update by increasing the second quality correction value when there is the second terminal apparatus to which radio resources have been allocated by the second radio base station and the information related to the first schedule has not been received, in the case where the one or more processors has received notification from the first terminal apparatus about success of reception, of the data;
- update by decreasing the first quality correction value when there is no second terminal apparatus to which radio resources have been allocated by the second radio base station, or when there is the second terminal apparatus to which radio resources have been allocated by the second radio base station and the information related to the first schedule has been received, in the case where the one or more processors has received a notification from the first terminal apparatus about reception error from the first terminal apparatus, of the data; and
- update by decreasing the second quality correction value when there is the second terminal apparatus to which radio resources have been allocated by the second radio base station and the information related to the first schedule has not been received, in the case where the one or more processors has received a notification from the first terminal apparatus about reception error from the first terminal apparatus, of the data.

* * * * *